US012762172B1

(12) United States Patent
Schulz et al.

(10) Patent No.: US 12,762,172 B1
(45) Date of Patent: Oct. 13, 2026

(54) SEMANTIC DATA GROUPING WITH MACHINE-LEARNED MODELS VIA GRAPHICAL USER INTERFACES (GUIS)

(71) Applicant: SAS Institute Inc., Cary, NC (US)

(72) Inventors: Falko Schulz, Carindale (AU); Karl Prewo, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 19/358,078

(22) Filed: Oct. 14, 2025

Related U.S. Application Data

(60) Provisional application No. 63/800,299, filed on May 5, 2025.

(51) Int. Cl.
*G06F 16/35* (2025.01)
*G06F 16/3329* (2025.01)
*G06F 40/30* (2020.01)
*G06N 20/00* (2019.01)

(52) U.S. Cl.
CPC .......... *G06F 16/35* (2019.01); *G06F 16/3329* (2019.01); *G06F 40/30* (2020.01); *G06N 20/00* (2019.01)

(58) Field of Classification Search
None
See application file for complete search history.

(56) References Cited

U.S. PATENT DOCUMENTS 10,239,063 B2 * 3/2019 Vester .................... B04B 5/0421
12,119,115 B2 * 10/2024 Foschini ................ G16H 50/20
12,541,719 B1 * 2/2026 Lu .......................... G06N 20/00
12,548,459 B1 * 2/2026 Lin .......................... G09B 7/02
12,619,423 B1 * 5/2026 Statham .................... G06F 8/65
2016/0368003 A1 * 12/2016 Vester ...................... B04B 11/04
2023/0196477 A1 * 6/2023 Bassi ...................... G06Q 10/40 705/319
2024/0119045 A1 * 4/2024 Aggarwal ......... G06F 16/24556
2025/0104805 A1 * 3/2025 Yokoyama ............. G16B 30/10
2025/0157572 A1 * 5/2025 Yokoyama ............. G16B 20/20
2025/0218088 A1 * 7/2025 Marchant ................ G06T 11/60

(Continued)

OTHER PUBLICATIONS

Pre-Train, Prompt, and Predict: A Systematic Survey of Prompting Methods in Natural Language Processing (Year: 2023).*
PRCBERT: Prompt Learning for Requirement Classification using BERT-based Pretrained Language Models (Year: 2022).*
Salesforce, "TABLEAU-CRM-EINSTEIN-DISCOVERY-CONSULTANT Exam, Questions & Answers," Version 4.0 from "https://www.dumpsplanet.com/", 5 pages.
"Power BI vs Strategy One | Which Business Intelligence Tools Wins in 2025?" from "https://www.selecthub.com/business-intelligence-tools/power-bi-vs-strategy-one/" Jun. 9, 2025, 32 pages.

(Continued)

*Primary Examiner* — Kim T Nguyen
(74) *Attorney, Agent, or Firm* — Dority & Manning, P.A.

(57) ABSTRACT

Information indicative of a first user input to a data analytics application is received. The first user input selects a plurality of data elements. A first task for a machine-learned model to perform with the plurality of data elements is identified from a plurality of candidate tasks. A first prompt corresponding to the first task is retrieved from a plurality of prompts associated with the plurality of candidate tasks, wherein the first prompt instructs the machine-learned model to perform one or more first actions to complete the first task. The first prompt and the plurality of data elements are processed with the machine-learned model to generate a model output, wherein the model output comprises information indicative of a plurality of categories and category assignment information that assigns the plurality of data elements to the plurality of categories. The model output is sent to the data analytics application.

22 Claims, 22 Drawing Sheets

(56) References Cited

U.S. PATENT DOCUMENTS

| | | | | |
|---|---|---|---|---|
| 2025/0252748 | A1* | 8/2025 | Frenkel | G06V 10/82 |
| 2025/0371449 | A1* | 12/2025 | Thompson, III | G06N 3/006 |
| 2026/0003689 | A1* | 1/2026 | Zheng | G06F 9/5027 |
| 2026/0014422 | A1* | 1/2026 | Jacobs | A63B 24/0075 |
| 2026/0017301 | A1* | 1/2026 | Vieri | G06F 16/3344 |
| 2026/0023919 | A1* | 1/2026 | Goel | G06F 40/143 |
| 2026/0057243 | A1* | 2/2026 | Brown | G06N 3/094 |
| 2026/0065885 | A1* | 3/2026 | Hardesty | G06N 20/00 |
| 2026/0073717 | A1* | 3/2026 | Iscen | G06V 10/82 |
| 2026/0079679 | A1* | 3/2026 | Wang | G06F 8/38 |
| 2026/0111748 | A1* | 4/2026 | Kaplan | G06N 3/006 |
| 2026/0119802 | A1* | 4/2026 | Panwar | G06F 40/30 |
| 2026/0119856 | A1* | 4/2026 | Davis | G06N 3/0495 |
| 2026/0119995 | A1* | 4/2026 | Sohn | G06N 20/00 |
| 2026/0134331 | A1* | 5/2026 | Dasgupta | G06N 20/00 |

OTHER PUBLICATIONS

Alberto Ferrari and Marco Russo, “Introducing Microsoft Power BI,” Microsoft Press, 2016, 407 pages.
Inviso, “Microsoft Copilot in Fabric and Power BI,” Inviso, Apr. 2024, 16 pages.
Virtual Cockpit: Data Value Monitoring, Demay and Helou, “MicroStrategy HyperCards Booklet,” retrieved from “https://www.virtualcockpit.co.uk/app/download/10034141/HyperIntelligence+Booklet+virtual+Cockpit.pdf” Nov. 24, 2025, 18 pages.
Gilmore et al., “Artificial Intelligence and Machine Learning in Tableau,” Tableau, Jun. 23, 2021, 19 pages.

* cited by examiner

SEMANTIC DATA GROUPING WITH MACHINE-LEARNED MODELS VIA GRAPHICAL USER INTERFACES (GUIS)

PRIORITY CLAIM

This application claims the benefit of, and priority based on, 35 U.S.C. § 119 to U.S. Provisional Application No. 63/820,596, filed Jun. 9, 2025, and U.S. Provisional Application No. 63/800,299, filed May 5, 2025, the disclosure of which are incorporated herein by reference in their entirety.

BACKGROUND

In many data processing environments, information is collected and reported from disparate sources in the form of raw data, which must then be manipulated manually to achieve a form suitable for analysis or review. Such manipulation typically requires human operators to restructure the data, apply formatting, and generate intermediate datasets before the information can be meaningfully consumed. In particular, operators are often required to create custom groupings of the raw data, for example by aggregating values across selected categories or by reorganizing records into specific classifications not inherently present in the collected dataset.

SUMMARY

This summary is not intended to identify only key or essential features of the described subject matter, nor is it intended to be used in isolation to determine the scope of the described subject matter. The subject matter should be understood by reference to appropriate portions of the entire specification of this patent application, any or all drawings, and each claim.

In one implementation, a computer-program product is provided. The computer-program product is tangibly embodied in a non-transitory machine-readable storage medium. The computer-program product including instructions operable to cause one or more processor devices to receive information indicative of a first user input to a data analytics application, wherein the first user input selects a plurality of data elements. The instructions are further operable to cause the one or more processor devices to identify a first task for a machine-learned model to perform with the plurality of data elements from a plurality of candidate tasks. The instructions are further operable to cause the one or more processor devices to retrieve a first prompt corresponding to the first task from a plurality of prompts associated with the plurality of candidate tasks, wherein the first prompt instructs the machine-learned model to perform one or more first actions to complete the first task. The instructions are further operable to cause the one or more processor devices to process the first prompt and the plurality of data elements with the machine-learned model to generate a model output, wherein the model output comprises information indicative of a plurality of categories and category assignment information that assigns the plurality of data elements to the plurality of categories. The instructions are further operable to cause the one or more processor devices to send the model output to the data analytics application.

In another implementation, a computing system is provided. The computing device includes a processor device and a non-transitory computer-readable storage medium containing instructions. The instructions, when executed on the processor device, causes the processor device to receive information indicative of a first user input to a data analytics application, wherein the first user input selects a plurality of data elements. The processor device is further to identify a first task for a machine-learned model to perform with the plurality of data elements from a plurality of candidate tasks. The processor device is further to retrieve a first prompt corresponding to the first task from a plurality of prompts associated with the plurality of candidate tasks, wherein the first prompt instructs the machine-learned model to perform one or more first actions to complete the first task. The processor device is further to process the first prompt and the plurality of data elements with the machine-learned model to generate a model output, wherein the model output comprises information indicative of a plurality of categories and category assignment information that assigns the plurality of data elements to the plurality of categories. The processor device is further to send the model output to the data analytics application.

In another implementation, a method is provided. The method includes receiving, by a computing system comprising one or more processor devices, information indicative of a first user input to a data analytics application, wherein the first user input selects a plurality of data elements. The method further includes identifying, by the computing system, a first task for a machine-learned model to perform with the plurality of data elements from a plurality of candidate tasks. The method further includes retrieving, by the computing system, a first prompt corresponding to the first task from a plurality of prompts associated with the plurality of candidate tasks, wherein the first prompt instructs the machine-learned model to perform one or more first actions to complete the first task. The method further includes processing, by the computing system, the first prompt and the plurality of data elements with the machine-learned model to generate a model output, wherein the model output comprises information indicative of a plurality of categories and category assignment information that assigns the plurality of data elements to the plurality of categories. The method further includes sending, by the computing system, the model output to the data analytics application.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
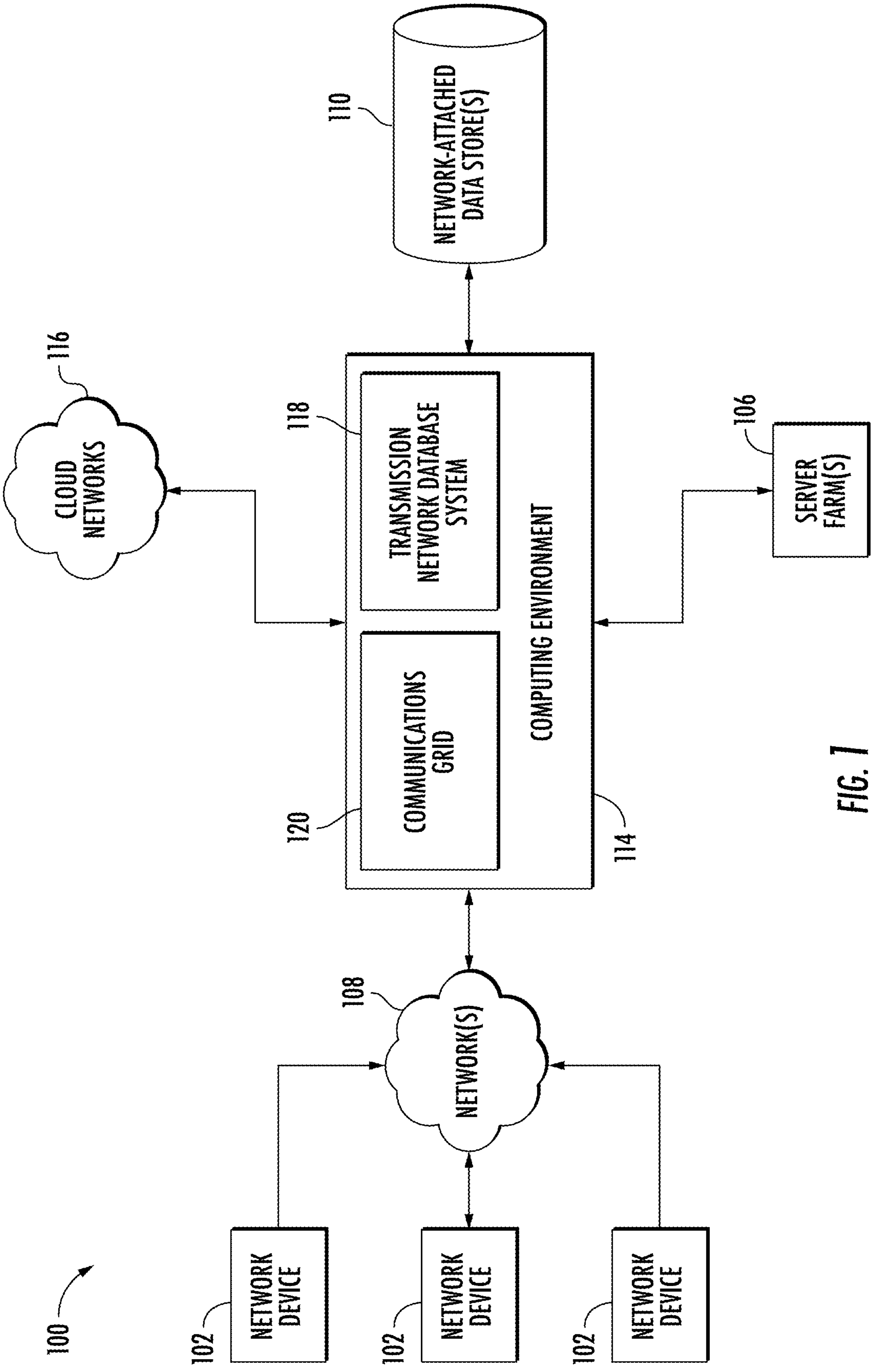
FIG. 1 illustrates a block diagram that provides an illustration of the hardware components of a computing system, according to some embodiments of the present technology.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Data analysis typically requires human operators to restructure raw data, apply formatting, and generate intermediate datasets before the information can be meaningfully consumed. In particular, operators are often required to create custom groupings of the raw data, for example by aggregating values across selected categories or by reorganizing records into specific classifications not inherently present in the collected dataset.

When creating custom groupings of raw data, human operators rely on a wide array of contextual information, including existing classifications of the data, supplementary data, knowledge of a corresponding process, etc. However, manual data classification can be prohibitively difficult, especially for large data sets that can include thousands, or millions, of data elements. Human operators must first identify the criteria by which to categorize data elements, which can be semantic in nature (e.g., whether to categorize U.S. states by geographic location, size, population, favorite food, etc.). Even the act of determining which criteria to apply for categorization can require human operators to possess a significantly deep understanding of the data elements in question and the relevant contextual information.

In recent years, attempts have been made to automate the restructuring of raw data using machine learning techniques. For example, a human may provide a dataset to a machine learning model alongside instructions to categorize the raw data. However, a machine learning model handling such a request generally will not have access to the same contextual information as a human operator, which in turn can degrade model performance by an unacceptable degree. And while a human operator may attempt to provide such contextual information as an input to the model, the collection and organization of such contextual information for input to the model can substantially reduce, or eliminate, any improvements in efficiency resulting from use of the model itself.

Accordingly, implementations described herein propose semantic data grouping with machine learning models via graphical user interfaces. More specifically, a computing system (e.g., a cloud-based system, a user device, a set of devices including a cloud-based system and a user device, etc.) can cause a user interface for a data analytics application to be provided to a user. The user interface can enable the user to interact with a dataset that includes raw data elements that have not yet been fully categorized. For example, the interface may be displayed via a client-side application rendered in a browser application executed on a user device.

The user interface can enable users to select existing data elements within the dataset. The user interface can further include input elements that, when selected, can cause contextual information to be obtained and processed alongside selected data elements with a machine-learned model. By doing so, implementations described herein obviate a variety of deficiencies associated with conventional approaches to machine learning based data categorization, which generally rely on chat-based interfaces to drive model behavior. For example, under a conventional approach, a user may copy a column of data elements and paste the data elements into a chat interface for a machine-learned model. The user can then instruct the model to perform data categorization for the data elements by entering instructions into the chat interface. If the user wishes to provide any contextual information to the model, the user must manually collect or describe such contextual information and provide the information via the interface. For example, if the data elements selected by the user are a portion of a larger dataset (e.g., U.S. cities in a dataset of cities in different countries), describing the contents of the dataset to model would likely affect the criterion the model selects to categorize the data elements. However, using a chat-based interface, the user would be required to manually describe the context of the dataset and the specific selection of data elements to the model. Additionally, in many instances, a user may not realize which contextual information to provide to a model until an inaccurate model output is received from the model. In turn, this can lead to multiple iterations in which the user communicates with the model to refine the model output, with each iteration incurring substantial computational resource costs.

Conversely, implementations described herein obviate the above deficiencies by automatically collecting contextual information from within the application environment, retrieving corresponding prompts, and instructing a machine-learning model to semantically categorize the data elements selected by the user based on the selected data elements and the provided contextual information. For example, assume that a user selects a plurality of data elements (e.g., a column of data elements) and selects the above-mentioned input element. The computing system can receive information indicating that a first user input selected the plurality of data elements and the interface element. The computing system can then identify a first task for the machine-learning model to perform with the plurality of data elements from a plurality of candidate tasks. For example, based on the data elements being selected, and contextual information provided alongside the selection of data elements (e.g., any categories created by the user, which data elements were selected from the larger dataset, etc.), the computing system can determine to perform a categorization task with the machine-learned model, where the machine-learned model categorizes the selected data elements in accordance with a particular categorization criterion, such as a semantic commonality shared between the selected data elements.

The computing system can retrieve a first prompt corresponding to the first task from a plurality of prompts associated with the plurality of candidate tasks. The first prompt can instruct the machine-learned model to perform one or more first actions to complete the first task. For example, to perform the categorization task, the prompt may instruct the machine-learned model to identify a categorization criterion by which to categorize the selected data elements (e.g., a population criterion for US states, a calorie criterion for food items, etc.).

The computing system can process the first prompt and the plurality of data elements with the machine-learned model to generate a model output. The model output can include information indicating a plurality of categories for the plurality of data elements. The model output can further include category assignment information that assigns the plurality of data elements to the plurality of categories. The computing system can send the model output back to the data analytics application to be rendered for the user. In such fashion, implementations described herein enable semantic data grouping with machine learning models, thereby substantially reducing the time and computational resources required to perform manual data categorization.

Aspects of the present disclosure provide a number of technical effects and benefits. As one example technical effect and benefit, implementations described herein can substantially reduce the time and computational resource costs associated with manual data categorization and conventional machine-learning based data categorization. Generally, the process of manually categorizing data elements, especially for large datasets, is tedious and can require substantial time and computational resources from users. Manual data categorization is known to have poor outcomes when performed by users without deep knowledge of advanced data manipulation. Further, the outcomes of data categorization are strongly influenced by the categorization criterion selected by a user, and a user cannot select a criterion they are unaware of. For example, to select a criterion by which to manually categorize different cities, a user must possess contextual knowledge of the variety of different criterion by which cities could be categorized (e.g., population, location, elevation, demographics, etc.). To improve outcomes, users generally must research these criteria when manually categorizing data elements, thereby adding additional time and computational resource costs to a process that is already prohibitively lengthy and expensive.

Conventional approaches have attempted to leverage machine learning technologies to improve the inefficiencies of manual data categorization. Such approaches generally utilize a chat-based interface that enables a user to provide data elements and any necessary contextual information to a machine-learned model, and then instruct (i.e., prompt) the model to perform data categorization. However, these approaches exhibit a variety of deficiencies that reduce or obviate the improvements to manual data categorization gained from incorporating machine learning technologies. For example, as described previously, identifying and gathering contextual information to be provided to a machine-learned model can require substantial time and resources to perform manually. For another example, interacting with models via a chat interface to perform data categorization generally requires multiple "back and forth" iterations with the model to clarify instructions and refine model outputs. Each of these iterations can incur a substantial computational resource cost associated with inference processing.

Conversely, implementations described herein dynamically select and provide contextual information to machine-learned models while providing custom instructions to the model to perform semantic categorization of data elements, thereby substantially reducing time and computational resource costs associated with manual data categorization and conventional machine learning based approaches. For example, unlike chat interfaces that require conversational prompting, implementations described herein enable users to trigger models to perform complex tasks, such as custom category creation, via a single interaction within the data visualization context, thereby significantly streamlining the user's workflow. For another example, implementations described herein automatically collect the context of a selected data item (e.g., a column of values) into account when generating suggestions or performing actions, thereby obviating the need for the user to manually describe the data to the model. For another example, implementations described herein store dedicated prompt flows and process logic to ensure that the machine-learned model is specifically tuned and optimized for semantic data categorization, leading to more accurate and relevant results compared to general-purpose models. For yet another example, implementations described herein retain the benefits of "one-click" functionality while also enabling users to provide additional context, constraints, or preferences to refine the AI's output without navigating away from the data visualization, thereby further reducing the number of iterations necessary to achieve positive outcomes.

In such fashion, implementations described herein substantially reduce the time and computational resource costs associated with manual data categorization and conventional machine learning based approaches to data categorization. For example, by reducing (or obviating) the number of iterations in which additional inference processing is required to refine a model output, implementations described herein reduce computational resource usage (e.g., power, bandwidth, memory, storage, compute cycles, etc.) used to perform inference processing, thereby improving functionality of the system hosting the machine-learned model.

Example Systems

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
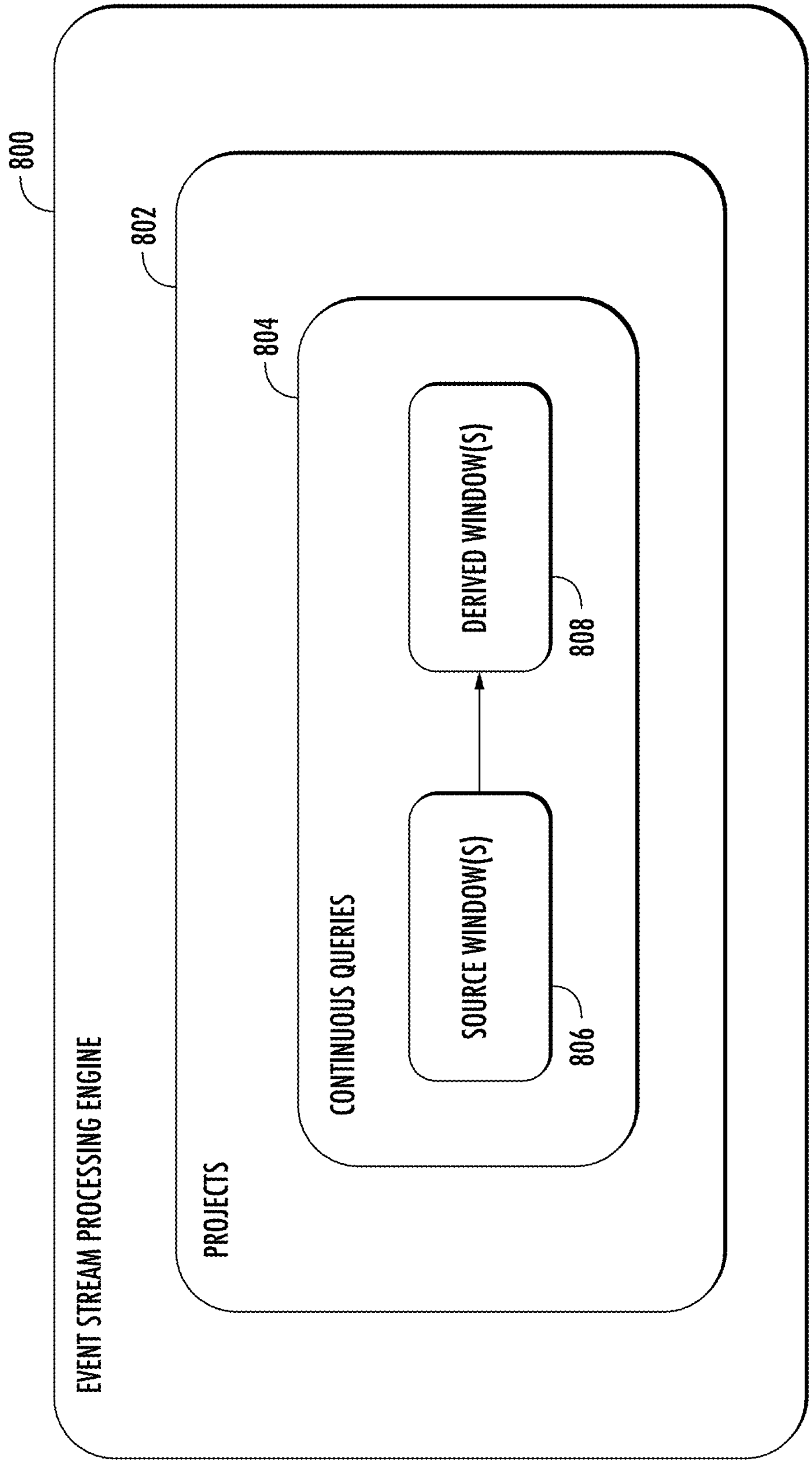
FIG. 8 illustrates a block diagram including components of an Event Stream Processing Engine (ESPE), according to embodiments of the present technology.
Figure 9:
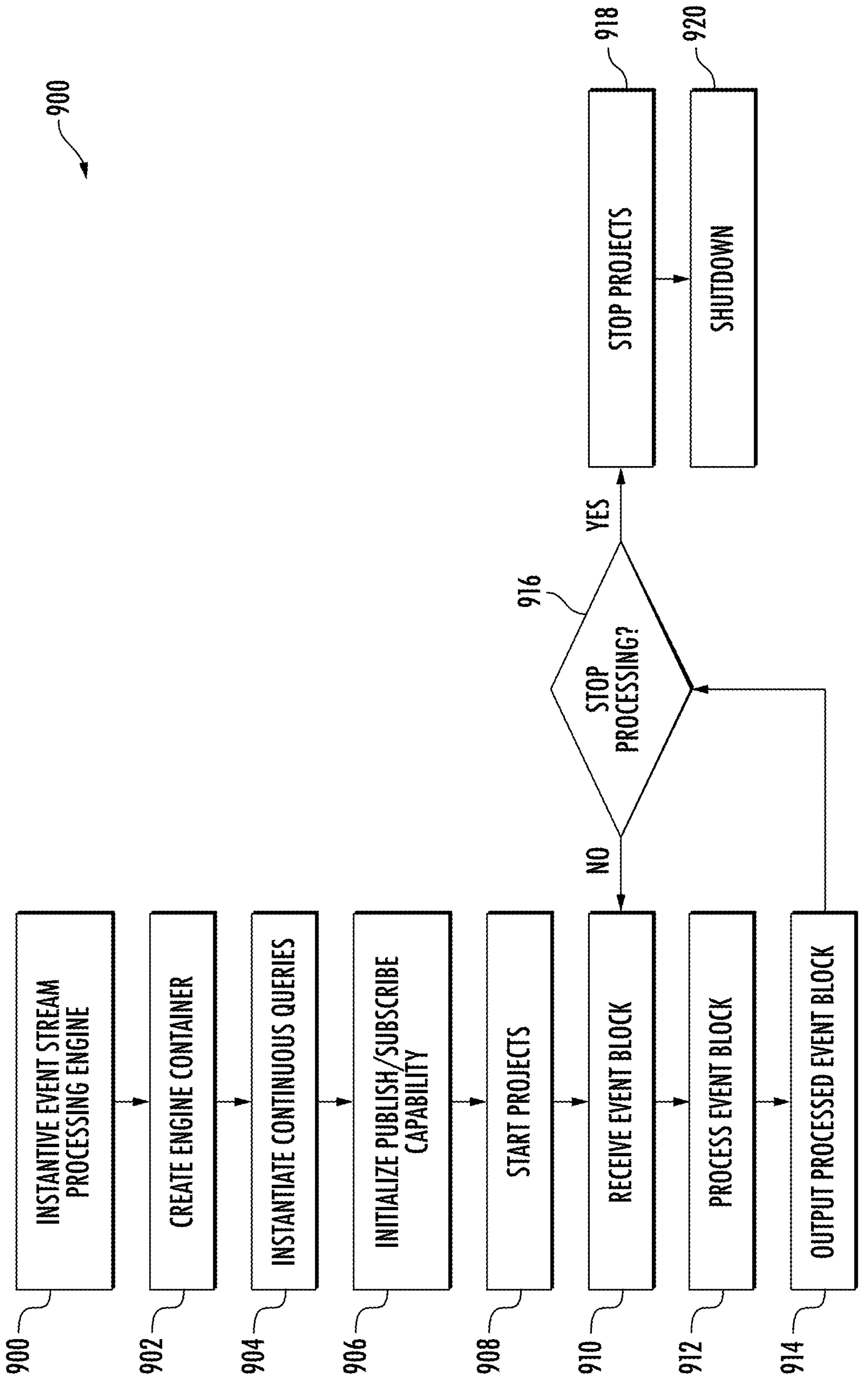
FIG. 9 illustrates a flow chart showing an example process including operations performed by an event stream processing engine, according to some embodiments of the present technology.
Figure 10:
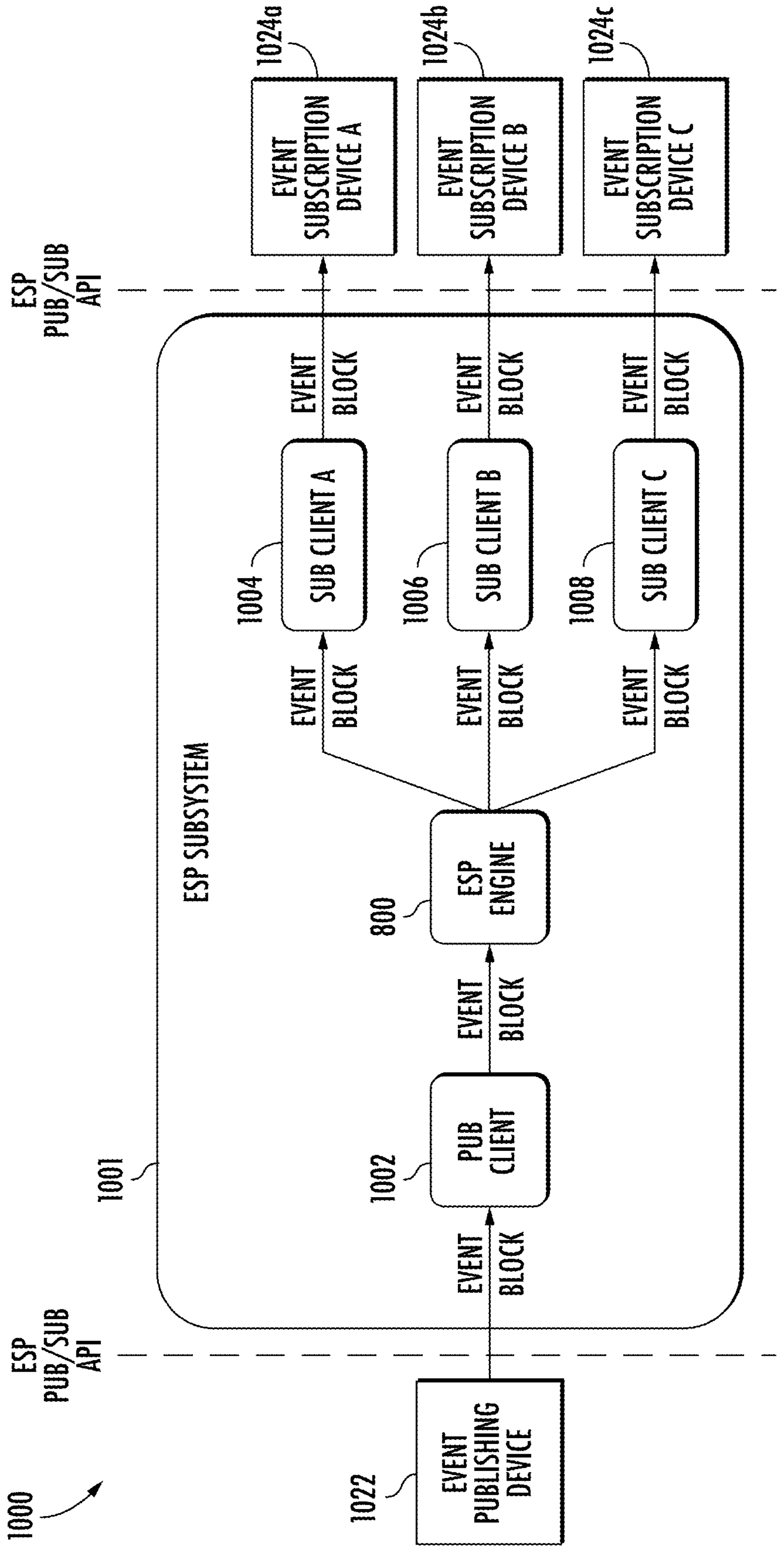
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IOT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
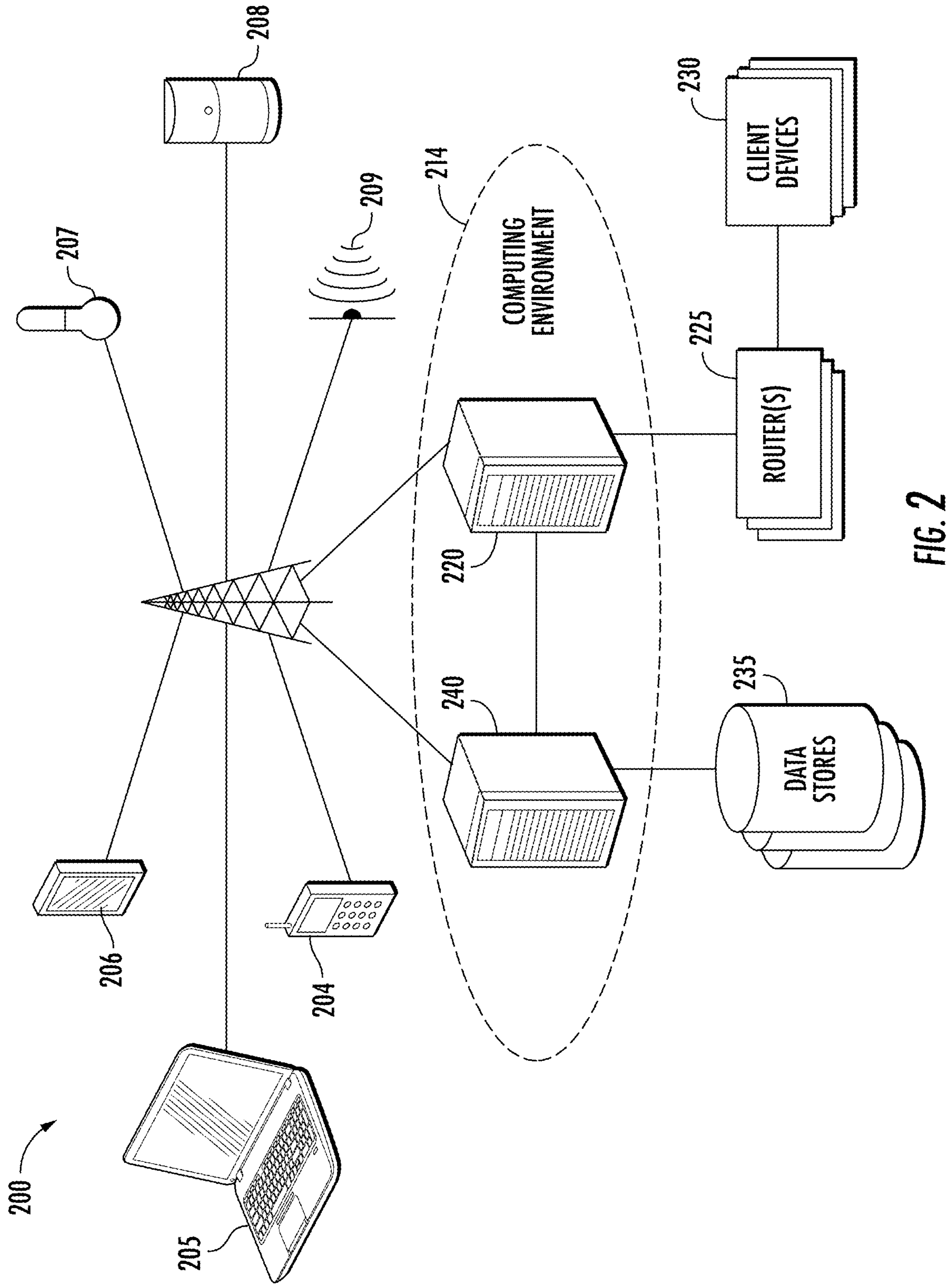
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
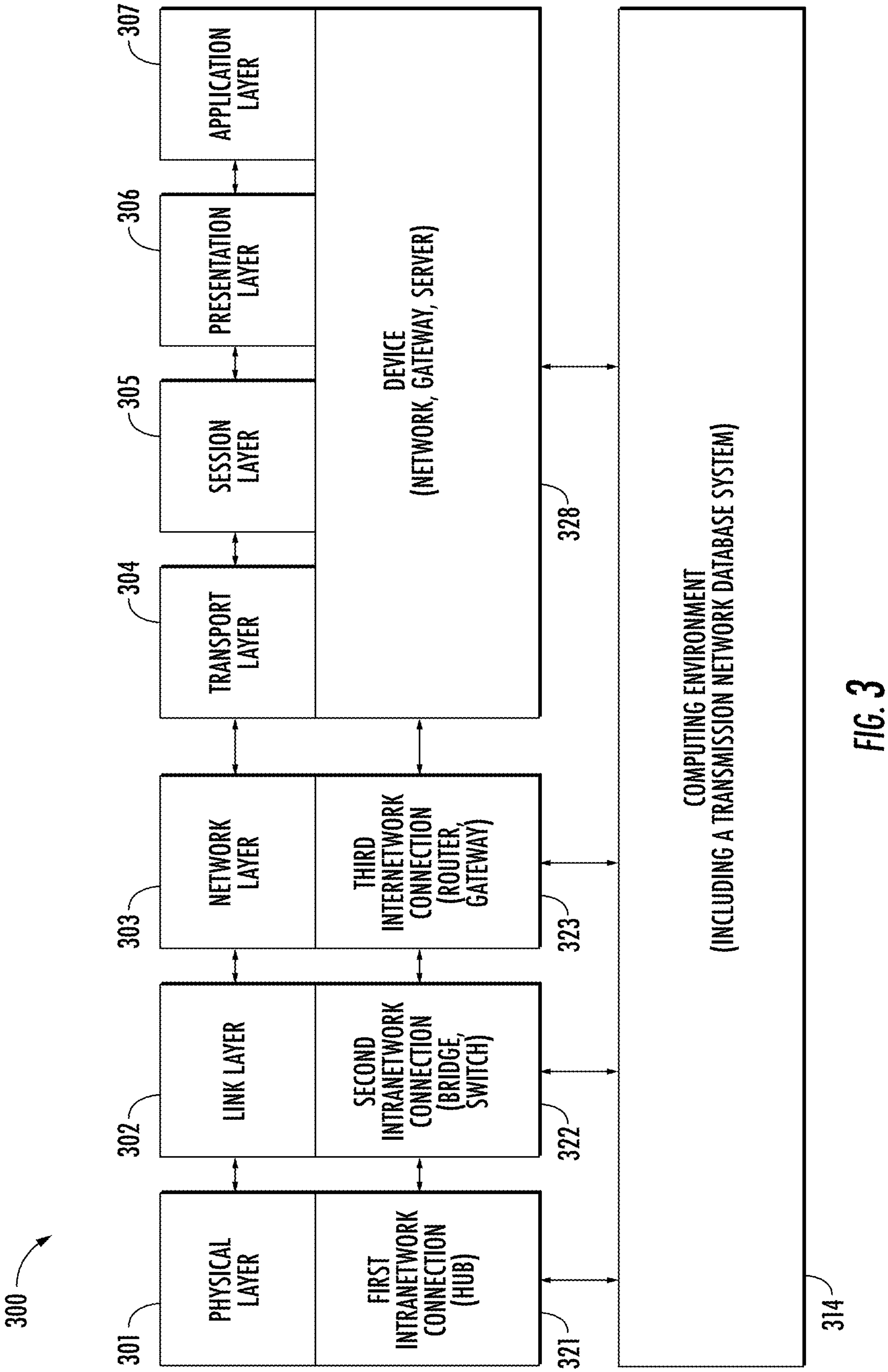
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
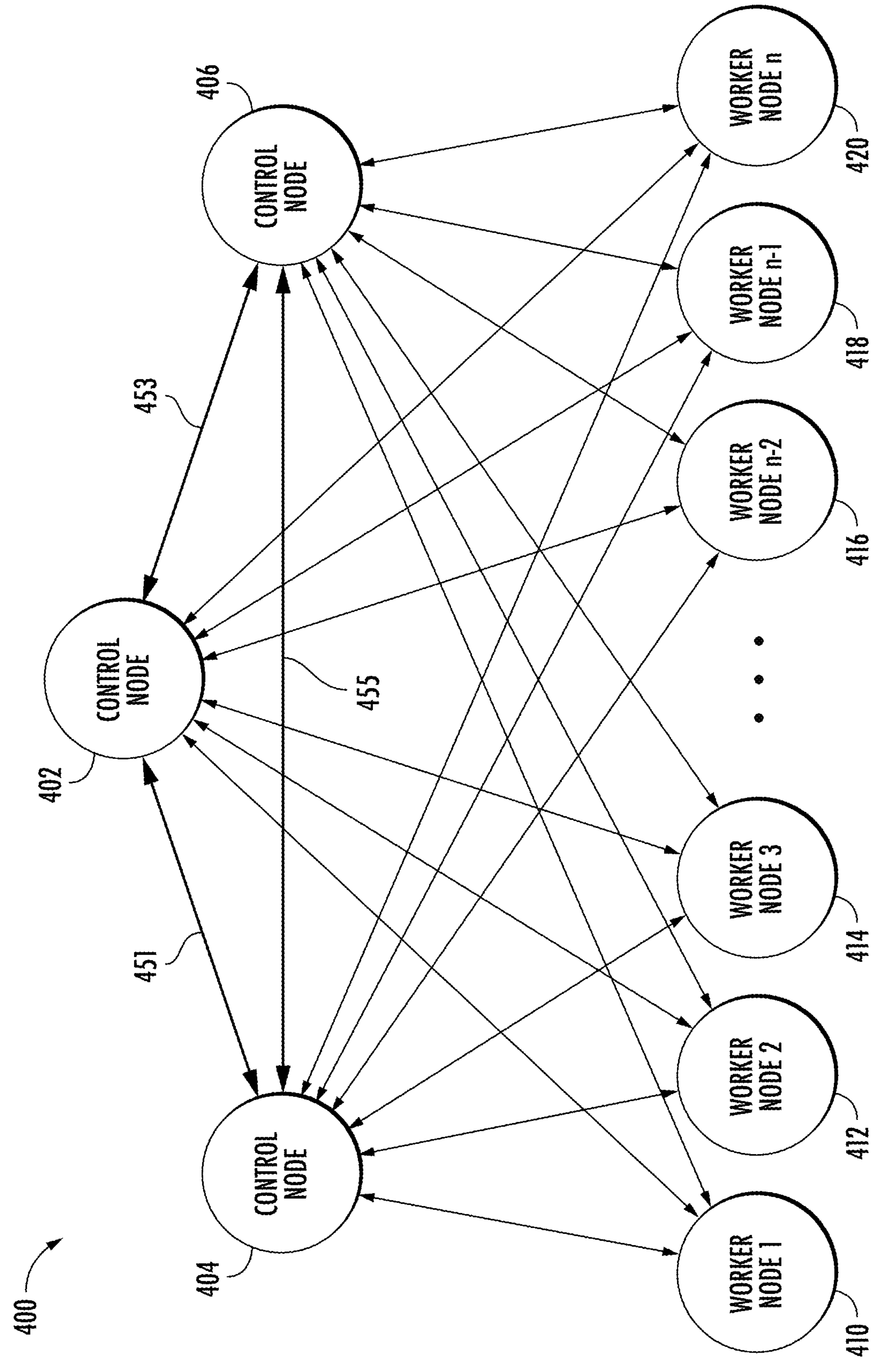
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
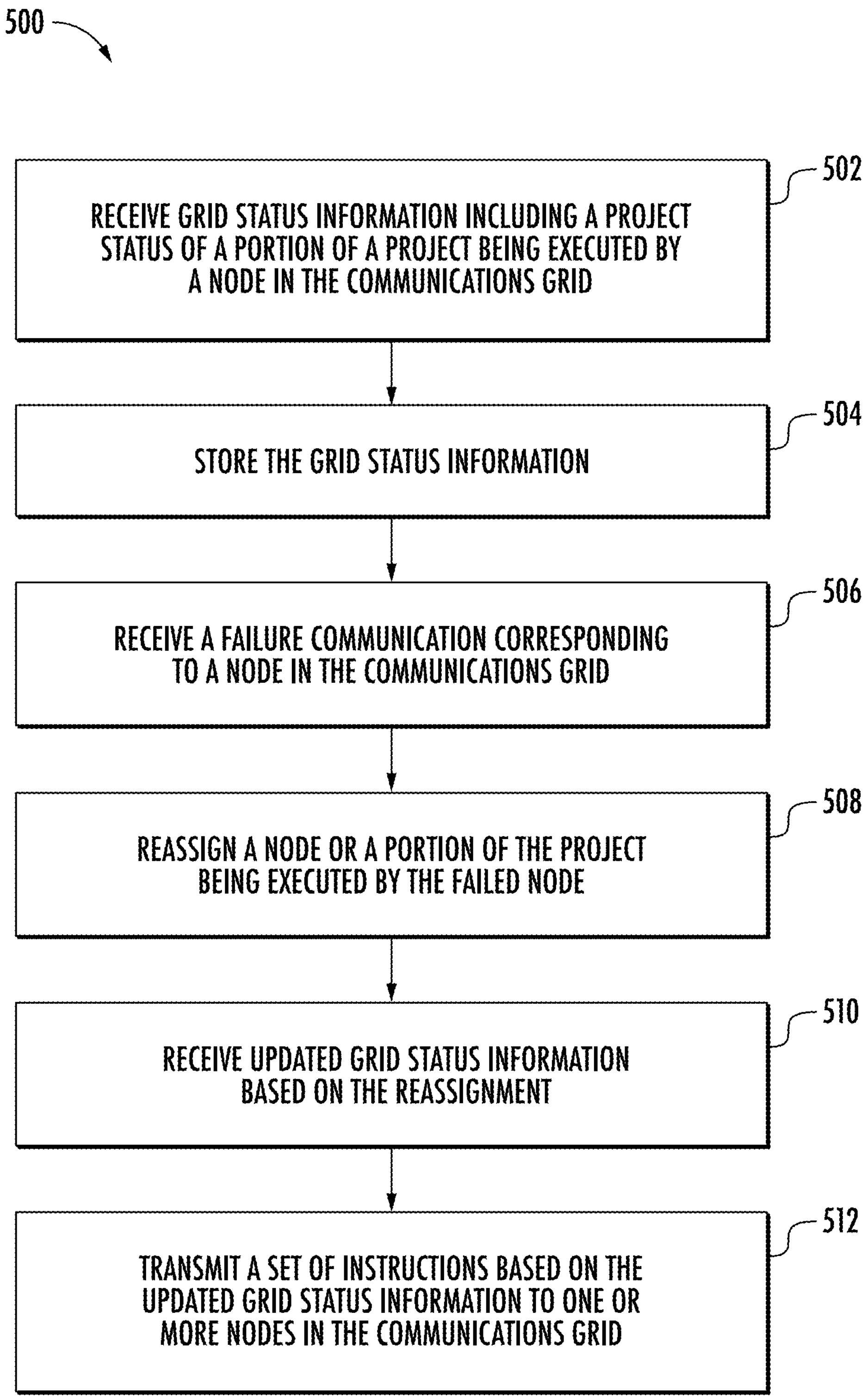
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
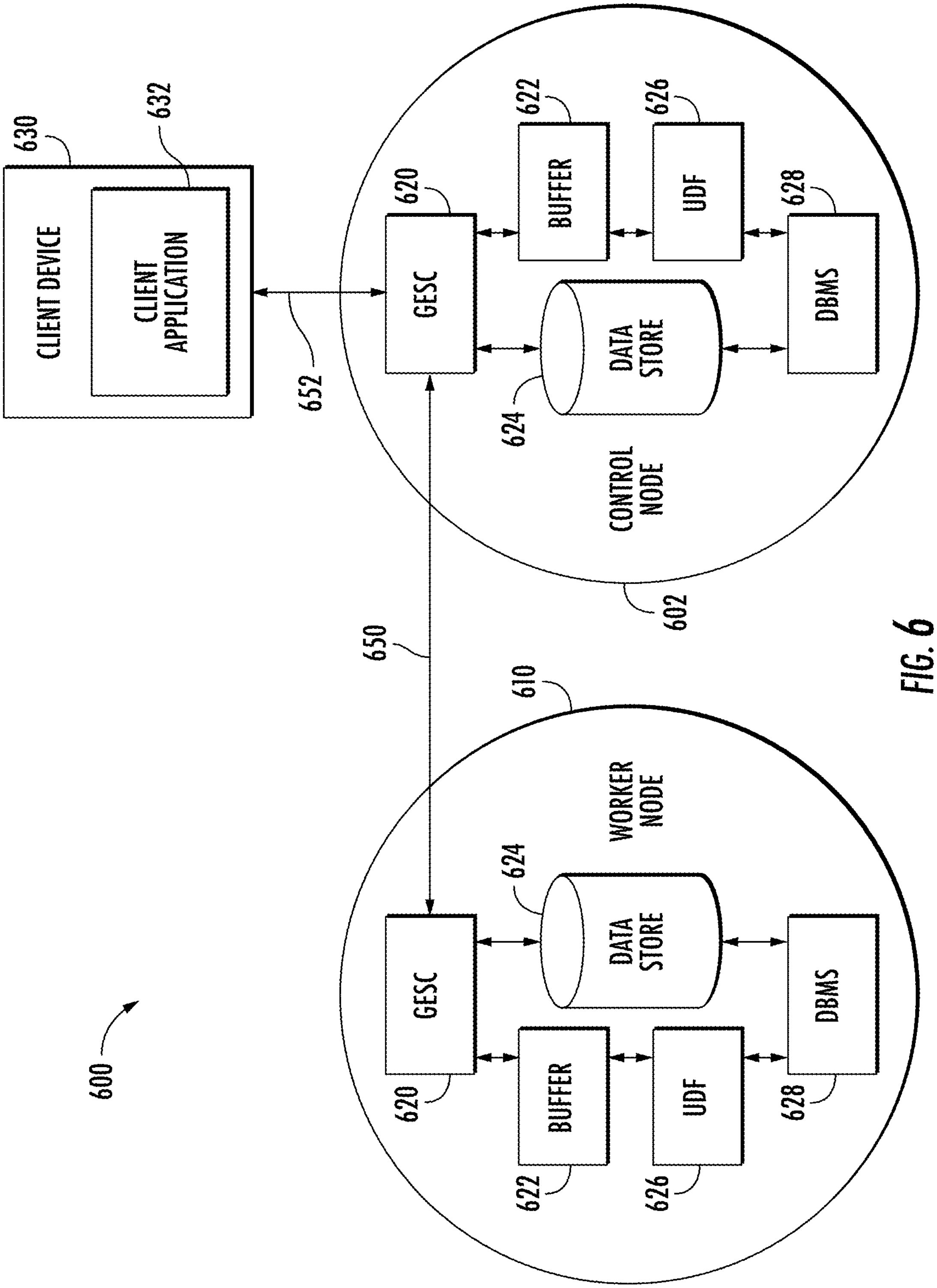
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650.

Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
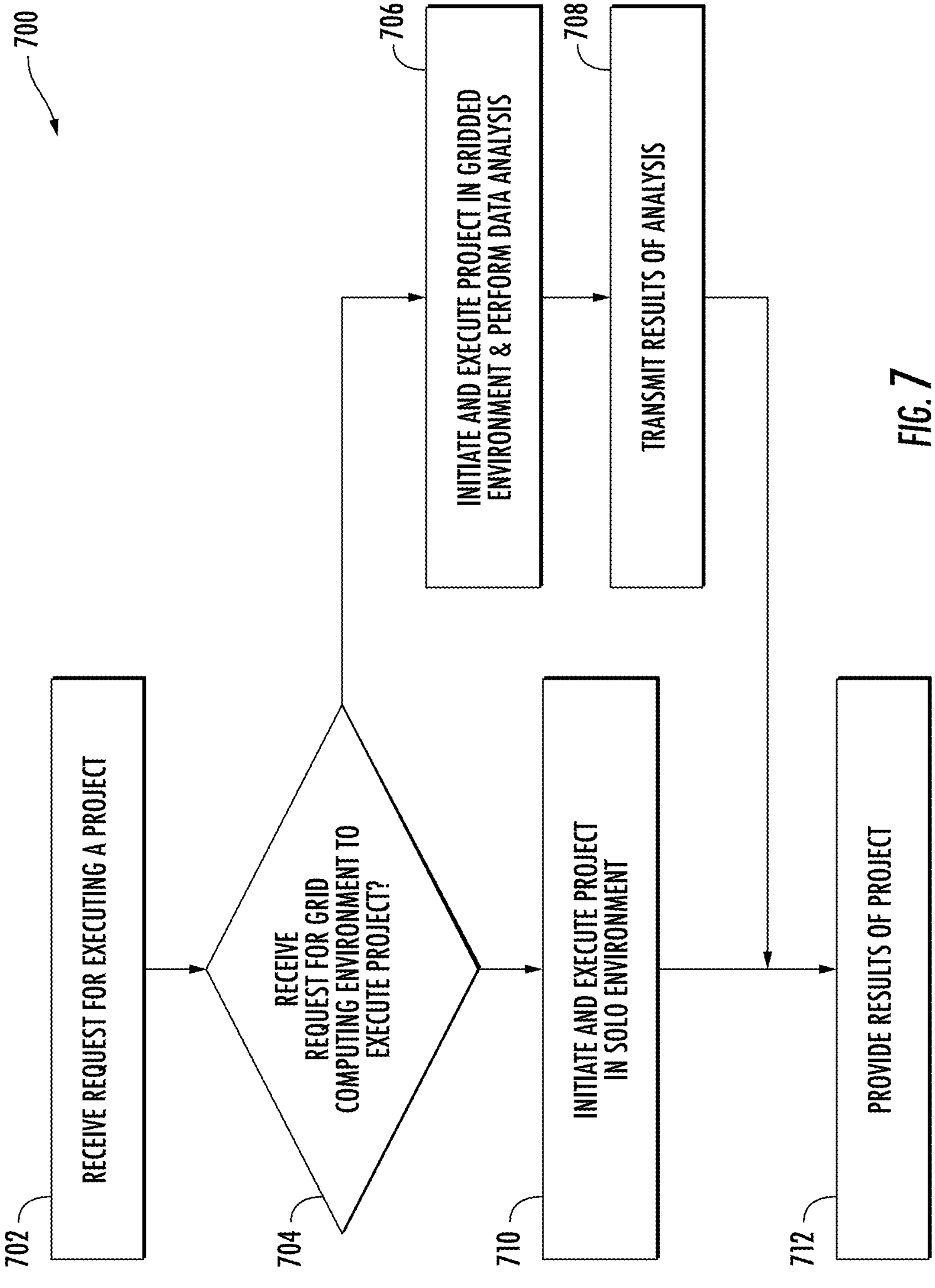
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
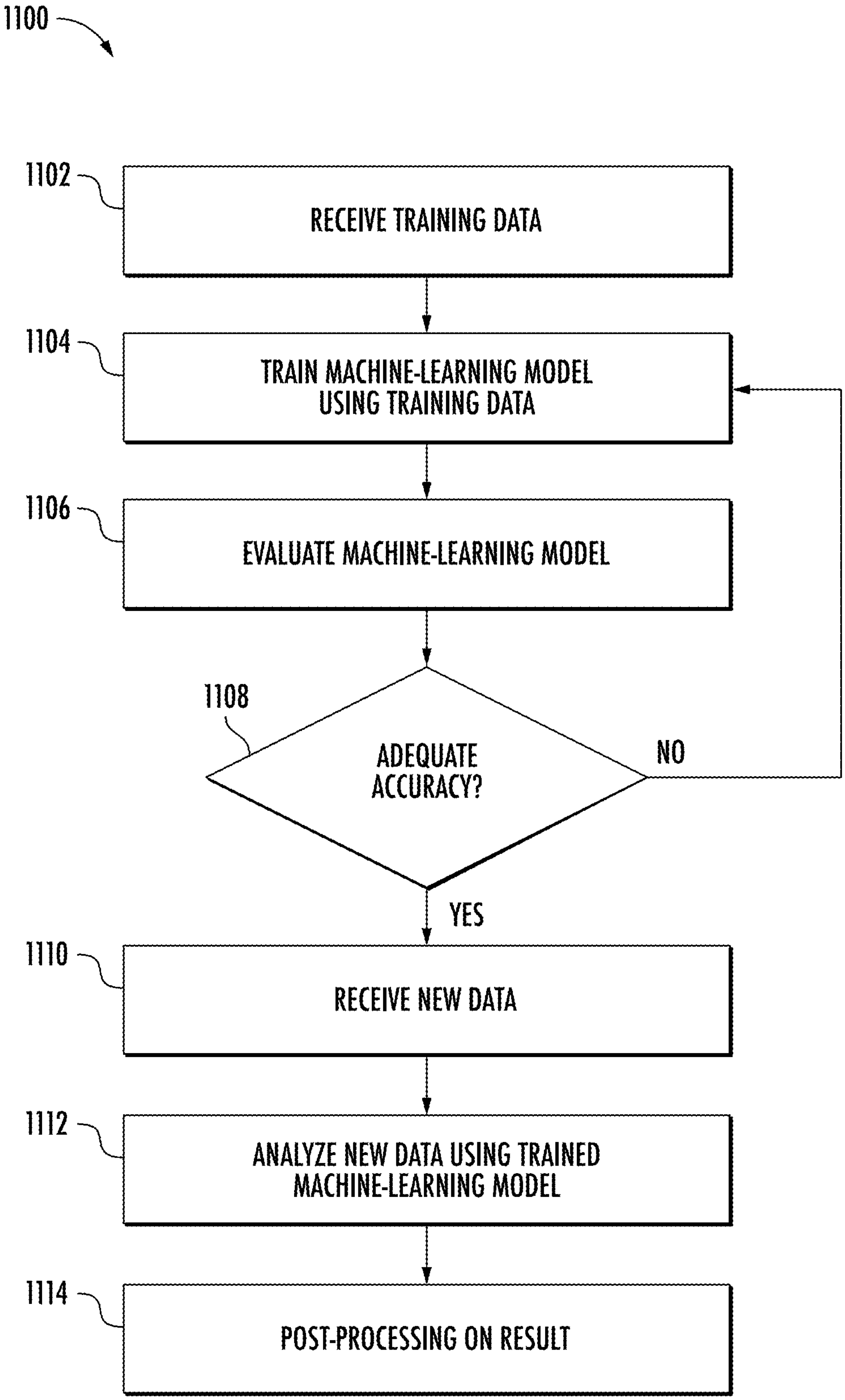
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
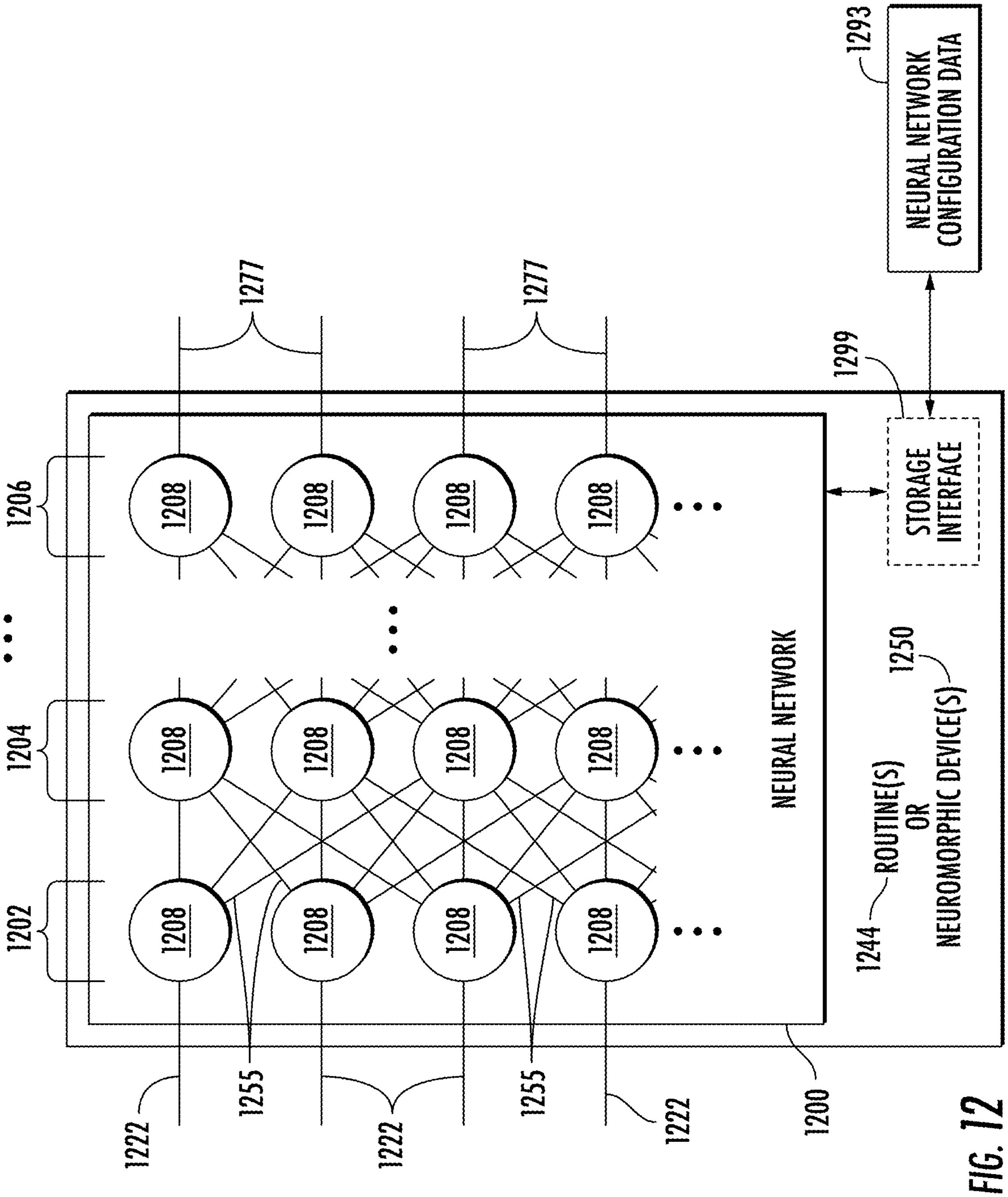
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI)

accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
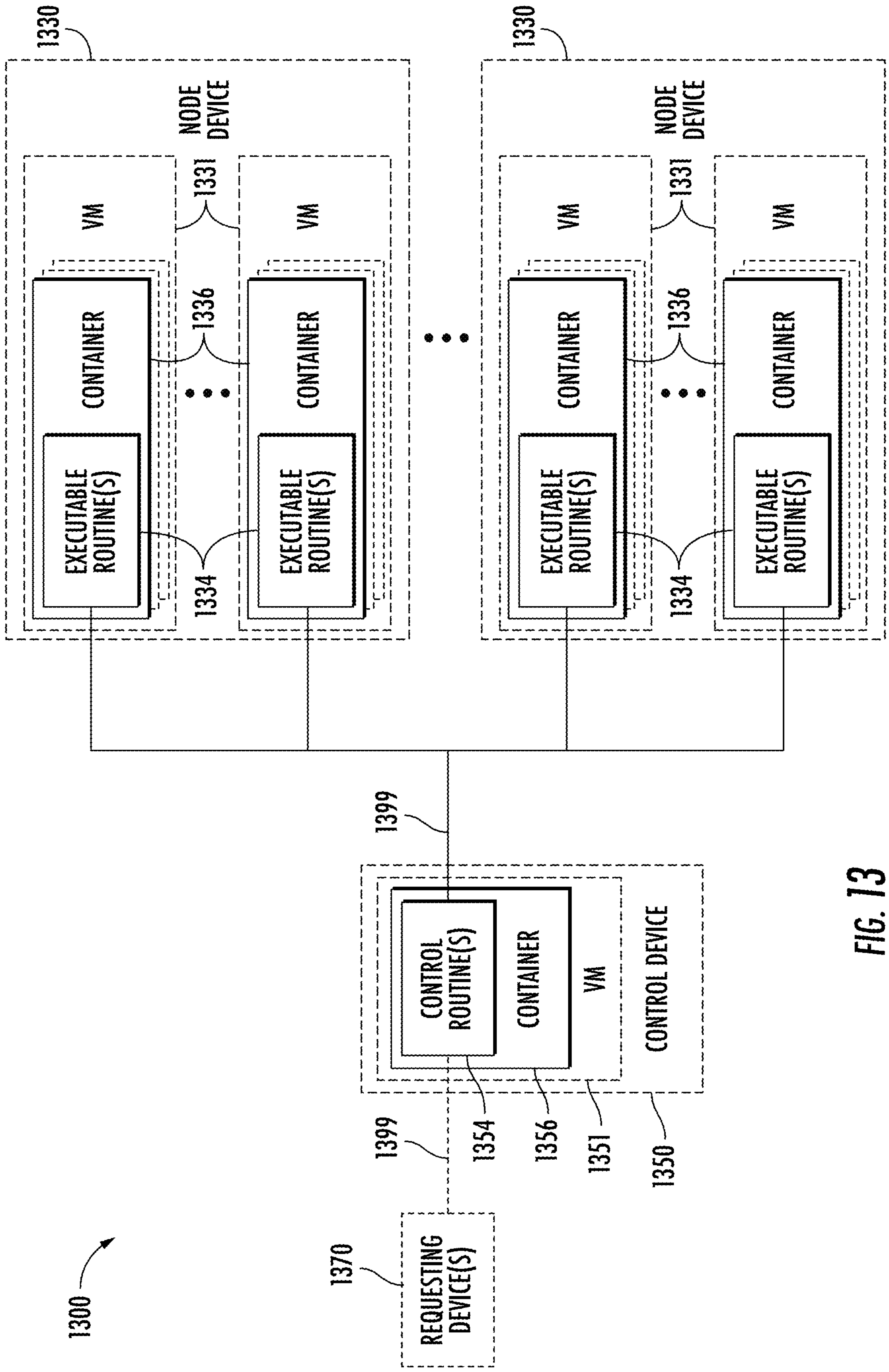
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
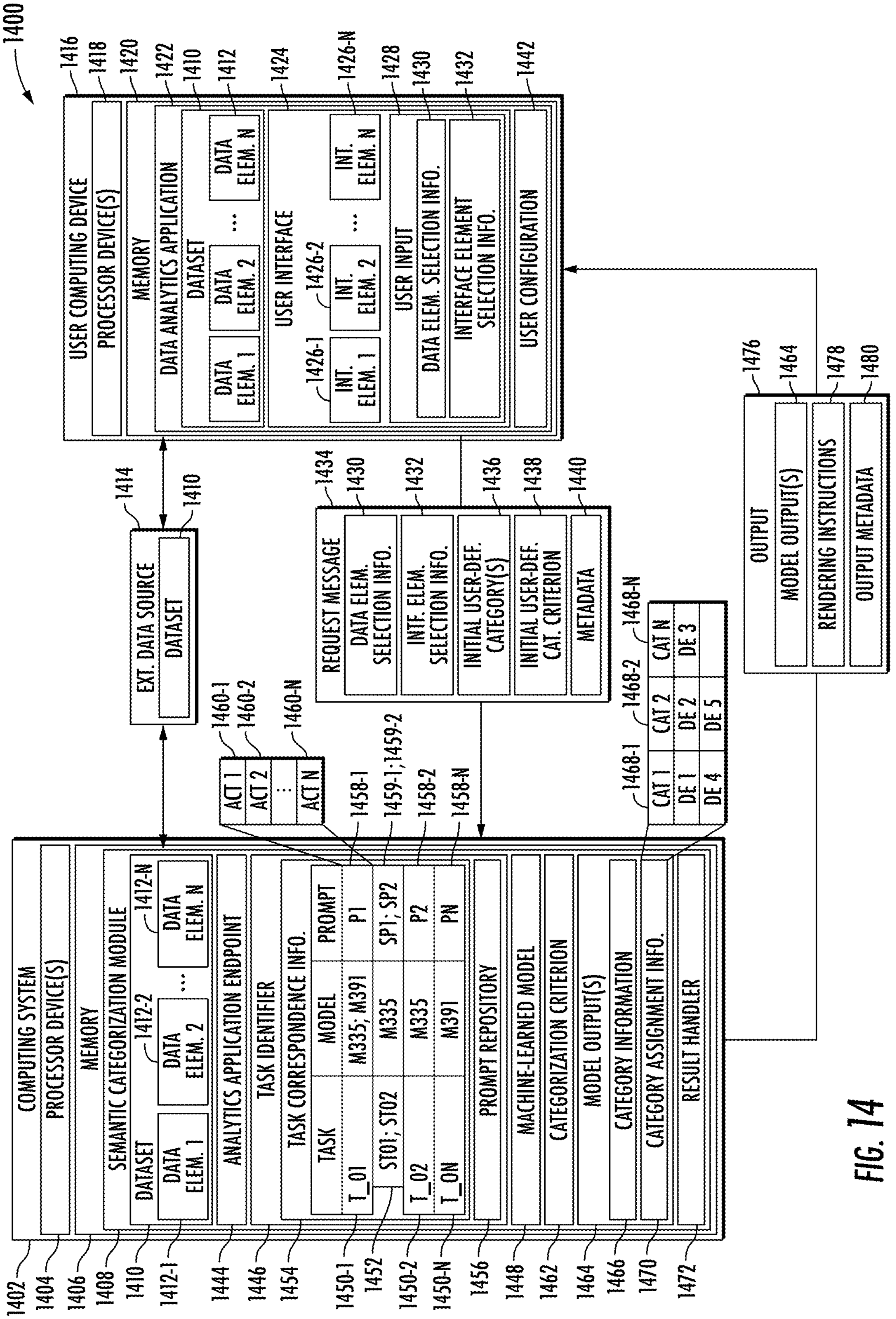
FIG. 14 is a block diagram of a computing environment suitable for implementing efficient semantic data grouping via graphical user interfaces with machine-learned models according to some implementations of the present disclosure.

FIG. 14 is a block diagram of a computing environment 1400 suitable for implementing efficient semantic data grouping with machine-learned models via graphical user interfaces (GUIs) according to some implementations of the present disclosure. A computing environment 1400 can include a computing system 1402 with one or more processor device(s) 1404 and a memory 1406. As described herein, the "computing environment" 1400 can be any type or manner of computing environment (e.g., a collection of computing devices, systems, and related infrastructure associated with a particular entity or organization), such as a "confidential" computing environment in which sensitive data and code is protected during processing, a "public" computing environment, etc.

In particular, the computing environment 1400 includes a user computing device that executes a data analytics application, and a computing system that provides a semantic categorization module. In conjunction, the data analytics application and the semantic categorization module enable efficient and accurate semantic data categorization via a "one-click" interface. Unlike chat interfaces and other conventional approaches, which require conversational prompting, the "one-click" functionality described herein enables users to trigger complex generative AI workflows, such as custom category creation, with a single click directly within the data visualization context. In addition, this functionality automatically captures the context of the selected data items for provision to machine-learned models when generating outputs or performing actions. This functionality eliminates the need for the user to draft a detailed description of relevant context when calling a model for data analysis tasks.

In some implementations, the computing environment 1400 can be or otherwise include a confidential computing "enclave" that leverages hardware-based execution environments and secure virtualization technologies, such as memory encryption, to isolate critical computations and prevent unauthorized access to data while in use. Additionally, or alternatively, in some implementations, the computing environment 1400 can be a distributed computing environment that utilizes computing resources across a variety of different types of devices (e.g., servers, virtualized devices, user devices, Internet-of-Things (IoT) devices, etc.).

Additionally, or alternatively, in some implementations, the computing environment 1400 can be a cloud computing environment implemented using the computing system 1402. For example, the computing system 1402 can implement a cloud computing platform by implementing a variety of cloud modules to provide cloud functionality. The cloud computing platform implemented by the computing system 1402 can be utilized by various users, entities, organizations, devices, etc. within (and/or external to) the computing environment 1400.

In some implementations, the computing system 1402 may be a computing device that includes multiple computing devices (i.e., a computing system). Alternatively, in some implementations, the computing system 1402 may be one or more computing devices within a computing system that includes multiple computing devices. Similarly, the processor device(s) 1404 may include any computing or electronic device capable of executing software instructions to implement the functionality described herein.

The memory 1406 can be or otherwise include any device(s) capable of storing data, including, but not limited to, volatile memory (random access memory, etc.), non-volatile memory, storage device(s) (e.g., hard drive(s), solid state drive(s), etc.). In some implementations, the memory 1406 can include a containerized unit of software instructions (i.e., a "packaged container"). The containerized unit of software instructions can collectively form a container that has been packaged using any type or manner of containerization technique.

A containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

The memory 1406 can include a semantic categorization module 1408. The semantic categorization module 1408 can semantically categorize data elements using a machine-learned model. To do so, the semantic categorization module 1408 can obtain, or otherwise access, a dataset 1410. The dataset 1410 can include a plurality of data elements 1412-1-1412-N (generally, data elements 1412). The data elements 1412 can include any manner of data element, such as a value, a string, a character, etc. In some implementations, the dataset 1410 can be obtained from an external data source 1414 (e.g., a data store, an Internet-of-Things (IOT) device that stores measurements as data elements, an application programming etc.).

Alternatively, in some implementations, the computing environment 1400 can include a user computing device 1416, and the dataset 1410 (or at least the plurality of data elements 1412) can be received from the user computing device 1416. The user computing device 1416 can include processor device(s) 1418 and memory 1420 as described with regards to the processor device(s) 1404 and memory 1406 of the computing system 1402. The user computing device 1416 can be any type or manner of computing device, such as a desktop computer, a laptop, a smartphone, a tablet, etc. In some implementations, the user computing device 1416 may be a virtualized execution environment, such as a virtual desktop, virtual machine, etc.

The user computing device 1416 can execute a data analytics application 1422. As described herein, a "data analytics application" can refer to any unit of software instructions that, when executed, provides or otherwise facilitates access to data analysis, data processing, data visualization, etc. For example, the data analytics application may be a native application executed locally on the user computing device 1416 that communicates with another system, such as the computing system 1402, to complete compute-heavy tasks such as machine learning inference, data processing, data analysis, etc. For another example, the data analytics application 1422 may be a module for another application or program, such as a browser add-on, a locally executed web interface for a server-side data analytics application, etc. More specifically, in some instances, some (or all) data analytics functionality of the data analytics application can be performed at the computing system 1402.

The data analytics application 1422 can include the dataset 1410 and the data elements 1412. In some implementations, the data analytics application 1422 can obtain the dataset 1410 by a user inputting the dataset to the data analytics application 1422 (e.g., by uploading a file including the dataset 1410, by manually entering the dataset 1410, by providing an address to a location at which the dataset is accessible such as the external data source 1414, etc.). The data analytics application 1422 can enable a user of the user computing device 1416 to interact with the data elements 1412. For example, via interactions with the data analytics application 1422, a user may categorize the data elements 1412, analyze the data elements 1412, add new data elements to the dataset 1410, remove data elements from the dataset 1410, etc. In some implementations, the data analytics application 1422 can facilitate utilization of the dataset 1410, or utilization of information computed from the dataset 1410. For example, the data analytics application 1422 may compute some value(s) from an analysis of the data elements 1412 (e.g., a mean value, etc.) and send the derived values to another process (e.g., a machine learning process, an autonomous process, etc.).

The data analytics application 1422 can render a user interface 1424 for display to a user of the user computing device 1416. For example, the user interface 1424 may be rendered via a display device communicatively coupled to the user computing device 1416. The user interface 1424 can include a plurality of interface elements 1426-1-1426-N (generally, interface elements 1426). The interface elements 1426 can enable a user of the data analytics application 1422 to interact with various features and functionalities of the data analytics application 1422. In particular, specific elements of the interface elements 1426, when selected, can cause the data analytics application to perform certain operations in conjunction with the computing system 1402.

The user of the data analytics application 1422 can provide a user input 1428 to the data analytics application 1422. The user input 1428 can cause generation of data element selection information 1430. The data element selection information 1430 can select some (or all) of the plurality of data elements 1412. For example, the user may select a specific grouping of data elements (e.g., a column, a row, etc.) by interacting with an interface element of the interface elements 1426 that represents the column. For another example, the user may interact with a visual representation of each of the data elements the user wishes to select. The user input 1428 can further cause generation of interface element selection information 1432. The interface element selection information 1432 can describe the interface element(s) selected by the user from the interface elements 1426 of the user interface 1424. In some implementations, the data elements 1412 selected by the user may belong to a particular grouping of data elements (e.g., a column of data elements, a row of data elements, etc.). For example, each of the data elements 1412 may belong to a grouping of data elements representing U.S. States.

Figure 15:
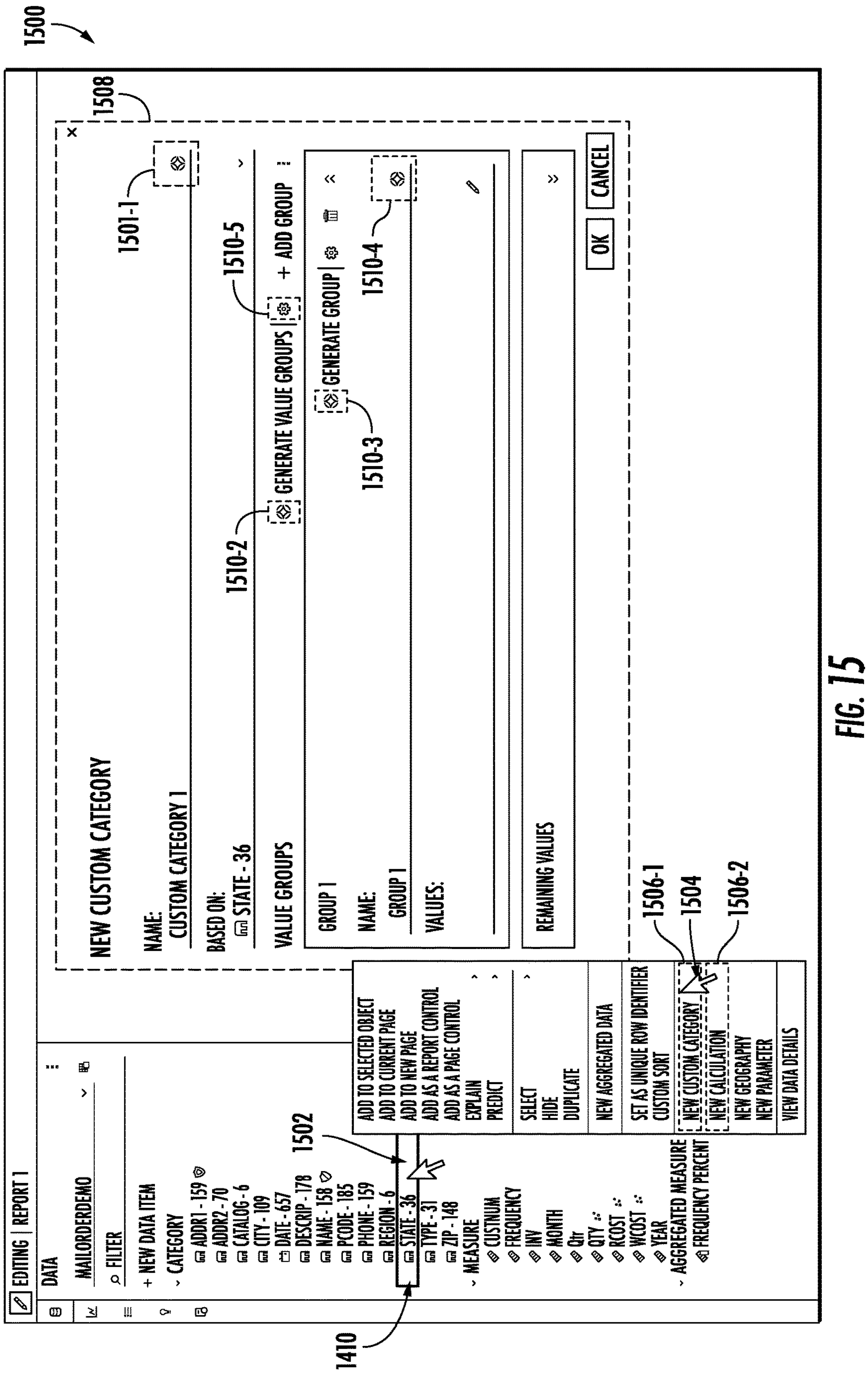
FIG. 15 illustrates a first view of the user interface of FIG. 14 according to some implementations of the present disclosure.

For a more specific example, turning to FIG. 15, FIG. 15 illustrates a first view 1500 of the user interface 1424 of FIG. 14 that enables "one-click" semantic data categorization according to some implementations of the present disclosure. In particular, FIG. 15 illustrates an example user interface with specifically configured interface element(s) that, when selected by a user, can cause contextual information to be automatically collected from within the application environment, corresponding prompts to be retrieved, and instructions to be provided to a machine-learning model to semantically categorize the data elements selected by the user based on the selected data elements and the provided contextual information. It should be noted that the first view 1500 of the user interface 1424 (and any subsequent views) merely illustrates one example implementation of a wide variety of possible implementations of the user interface 1424. For example, in some other implementations (not illustrated), the dataset 1410 may be displayed at a different location within the user interface 1424 (e.g., on the right-hand side, etc.), interface elements may be displayed in a different manner (e.g., as "bubbles" that dynamically appear when a user hovers over the dataset 1410, etc.), etc.

As described previously, the user interface 1424 can include the interface elements 1426. It should be noted that the first view 1500 does not necessarily depict every interface element 1426 of the user interface 1424. Rather, some elements of the interface elements 1426 are not visible in the first view 1500, and are only revealed following subsequent interactions with the user interface 1424.

As illustrated in the first view 1500, the dataset 1410 (e.g., the "STATE" dataset) is selected by a user input submitted via a first cursor element 1502. It should be noted that the first cursor element 1502 represents the location of a cursor at a moment in which the user selected the dataset 1410. As such, subsequent cursor element representations illustrated herein can represent the location of the cursor at different moments when the user provides subsequent user inputs.

A dataset, as described herein, refers to a discrete set of data elements, and in some instances, can refer to a subset of data elements from a larger dataset. To follow the illustrated example, the dataset 1410 can be a grouping of "STATES" from a larger dataset that also includes a "PHONE" dataset, a "REGION" dataset, a "CITY" dataset, etc. As such, a dataset, as described herein, can refer to a specific subset of data elements from a larger dataset (e.g., a column or row of values from a dataset, a disparate set of elements extracted from a dataset, etc.). In some implementations, the plurality of data elements 1412 that are included in the dataset 1410 can be datasets of a particular type, or may share some semantic commonality. For example, the data elements included in the dataset 1410 (labeled "STATES") may be North American states or territories (e.g., North Carolina, Ontario, Oaxaca, Texas, California, Sinaloa, New York, Alberta, etc.) sharing the semantic commonality of being discrete states or territories in North America.

By selecting the dataset 1410 with the first cursor element 1502, the user interface 1424 can be populated with task selection elements 1506-1 and 1506-2. Both of the task selection elements 1506-1 and 1506-2 can correspond to different tasks of a plurality of tasks for a machine-learned model to perform. To follow the illustrated example, the task selection element 1506-1 can correspond to a categorization task for a machine-learned model to perform by categorizing the data elements selected by the user. The task selection element 1506-2 can correspond to a calculation task for a machine-learned model to perform by performing some computation using the data elements selected by the user.

The user can select the task selection element 1506-1 using a second cursor element 1504. Upon selection of the task selection element 1506-1 with the second cursor element 1504, the user interface 1424 can be populated with a categorization interface element 1508. The categorization interface element 1508 enables the user to more specifically instruct the model to perform the categorization task associated with the task selection element 1506-1. To do so, the categorization interface element 1508 includes a plurality of generative context elements 1510-1-1510-5 (generally, generative context elements 1510). Each of the generative context elements 1510, when selected, can cause a model to perform a specific operation based on the dataset 1410.

In some implementations, selection of the task selection element 1506-1 can cause the data analytics application 1422 to automatically collect contextual information to perform a semantic data categorization task. To follow the illustrated example, the data elements 1426 can be data elements within a "STATE" column of a dataset that includes other columns of data elements, such as "DATE", "CITY", "REGION", "TYPE", "ZIP", etc. The illustrated menu that includes the task selection element 1506-1 can be rendered in response to a user selecting the "STATE" column (e.g., with a right-click input, etc.). When selected, the data analytics application 1422 can include information describing characteristics of the other columns within the dataset that were not selected by the user (e.g., the DATE column, the CITY column, the REGION column, etc.). Such characteristics may include a title for a non-selected column, a size of a non-selected column, etc. The machine-learned model 1448 can utilize this information when performing the semantic data categorization task. For example, based on the existence of the "REGION" and "ZIP" columns, the machine-learned model 1448 may determine to categorize the data elements of the "STATE" column based on the geographic region in which the states are located.

In some implementations, the selection of the task selection element 1506-1 or 1506-2 can select the plurality of data elements 1412 based on the task selection elements 1506 being included in a menu interface element associated with the plurality of data elements 1412. To follow the illustrated example, a menu interface element that includes the task selection elements 1506 is rendered in association with the plurality of data elements 1412 within the "STATE" column. For example, the user may hover the cursor element 1502 over the "STATE" column or right click the "STATE" column, and in response, the menu interface element including the task selection elements 1506 can be rendered. If the user selects one of the task selection elements 1506, the data analytics application 1422 can determine that the user intends to select the data elements 1412 due to the task selection element 1506 being selected from the menu interface element that is rendered in association with the data elements 1412.

To follow the illustrated example, selection of the generative context element 1510-1 by the user can cause a machine-learned model to generate a label or "title" for the dataset 1410 selected by the user. As illustrated, the generative context element 1510-1 is placed inside the "title" field to indicate to users that selection of the element will cause the model to generate a title or label for the dataset. The machine-learned model can generate the title for the plurality of data elements 1412 selected by the user based on a semantic understanding of the data elements 1412. For example, if the data elements 1412 only include states from the United States, the model may generate a title such as "US States" or the like. If the data elements 1412 also include Canadian territories, the model may generate a title such as "North American States and Territories" or the like. If the data elements 1412 only included U.S. States to the east of the Mississippi river, the model may generate a title such as "East Coast U.S. States" or the like.

Selection of the generative context element 1510-2 by the user can cause the machine-learned model to generate custom categories for the data elements 1412 selected by the user and assign the data elements 1412 to the categories. Selection of the generative context element 1510-3 by the user can cause the machine-learned model to generate a single custom category for the data elements 1412, while selection of the generative context element 1510-4 by the user can cause the machine-learned model to generate a label for the single category. Selection of the generative context element 1510-5 by the user can cause the user interface 1424 to provide an interface element that enables the user to provide additional context. The generative context element 1510-5 will be discussed subsequently with regards to FIGS. 18A-18B.

It should be noted that the interface elements 1426 may refer to any of the interface elements described in the first view 1500 of the user interface 1424 and any subsequently discussed views of the user interface 1424, such as the task selection elements 1506, the categorization interface element 1508, the generative context elements 1510, etc.

Assume that the user selects the generative context element 1510-2 to cause the machine-learned model to generate custom categories for the data elements 1412. Returning to FIG. 14, upon selection of the generative context element 1510-2, the user computing device 1416 can generate a request message 1434. The request message 1434 can include the data element selection information 1430. To follow the illustrated example of FIG. 15, the data element selection information 1430 can indicate that the user selected each of the data elements 1412 included in the dataset 1410 (e.g., each of the "STATE" data elements). The request message 1434 can further include the interface element selection information 1432. The interface element selection information 1432 can specify the corresponding interface element(s) 1426 selected by the user within the first view 1500 of the user interface 1424 (e.g., the task selection element 1506-1 and the generative context element 1510-2).

In some implementations, the request message 1434 can include initial user-defined category information 1436. The initial user-defined category information 1436 can describe any categories created by the user prior to generation of the interface element selection information 1432. To follow the illustrated example of the first view 1500 of the user interface 1424 of FIG. 15, assume that the user creates a "value group" titled "East-coast States" without assigning any of the data elements 1412 to the category. The initial user-defined category information 1436 can describe the value group created by the user along with any data elements assigned by the user to the group. In this manner, the machine-learned model can utilize the initial user-defined category as context for identifying a criterion by which to categorize the data elements 1412 (e.g., based on the initial user-defined category being "East-coast states", the model may determine to use a geographical location criterion for categorizing the data elements 1412).

In some implementations, the request message 1434 can include initial user-defined categorization criterion 1438. The initial user-defined categorization criterion 1438 can specify a criterion by which the machine-learned model is to categorize the data elements 1412. To follow the previous example, rather than (or in addition to) creating a first value group titled "East-coast States", the user may instead enter (e.g., via a text field element, etc.) an instruction to "categorize these elements based on geographic location." The manner in which the user can provide the initial user-defined categorization criterion 1438 within the user interface 1424 will be discussed subsequently.

In some implementations, the request message 1434 can include metadata 1440. The metadata 1440 can include user-specific settings, historical information describing previous interactions by the user with the user interface 1424, etc. For example, the memory 1420 of the user computing device 1416 may include a user configuration 1442. The user configuration 1442 can specify preferences for specific tasks completed for the data analytics application 1422 (e.g., a maximum number of categories to be generated, a specific categorization criterion when working with data elements that share a certain semantic commonality, etc.). The metadata 1440 can include the user configuration 1442 (or certain portions thereof) for additional context. For another example, the user may have previously interacted with the user interface 1424 by manually revising previously generated categories or modifying the assignment of data elements to categories. The metadata 1440 can include information describing these changes from the user for additional context.

By generating the request message in response to the user interacting with the interface element 1506-1, implementations described herein enable the "one-click" functionality described previously, which enables users to trigger complex generative AI workflows, such as custom category creation, with a single click directly within the data visualization context. In this manner, contextual information such as the name fields for the selected data elements can be used to improve the semantic categorization of the data elements.

The request message 1434 can be received by the computing system 1402 from the user computing device 1416 (either directly or indirectly via an intermediary device). For example, the semantic categorization module 1408 may include an analytics application endpoint 1444 (e.g., an Application Programming Interface (API), a socket, an address, etc.) that the user computing device 1416 can utilize to provide the request message 1434. Upon receipt, the semantic categorization module 1408 can ingest the request message 1434.

To do so, the semantic categorization module 1408 can include a task identifier 1446. The task identifier 1446 can determine one or more tasks for a machine-learned model 1448 to perform based on the request message 1434. More specifically, the task identifier 1446 can identify a particular task 1450-1 from a plurality of candidate tasks 1450-1-1450-N (generally, candidate tasks 1450). The task 1450-1 can be identified based on the interface element selection information 1432. For example, if the user selects the task selection element 1506-1, the task identifier 1446 may identify the task 1450-1, while if the user selects the task selection element 1506-2, the task identifier may select the task 1450-2.

In some implementations, the task identifier 1446 can further identify one or more sub-task(s) 1452 based on the request message 1434. In some implementations, the sub-task(s) 1452 can be tasks to be performed when performing the selected task 1450-1. For example, the task 1450-1 can be a categorization task for the machine-learned model to perform by categorizing the selected plurality of data elements in accordance with a first categorization criterion. For another example, the task 1450-2 can be a categorization criterion suggestion task. For another example, the task 1450-N can be a labeling task for the machine-learned model to perform by generating a label descriptive of the plurality of categories.

Additionally, or alternatively, in some implementations, the sub-task(s) 1452 can be performed in addition to (e.g., subsequent to, prior to, etc.) performance of the selected task 1450-1. For example, if the task 1450-1 is a categorization task, the sub-tasks 1452 may include a categorization criterion identification task, a category creation task, and a category assignment task. Identification and performance of the sub-task(s) 1452 will be discussed subsequently.

The task identifier 1446 can include task correspondence information 1454. In some implementations, the task correspondence information 1454 can specify specific machine-learned models to utilize when performing certain tasks. For example, the machine-learned model 1448 may be one of a plurality of machine-learned models trained to perform corresponding tasks of the candidate tasks 1450 (e.g., one small language model (SLM) trained to perform semantic categorization, another SLM trained to perform computations, etc.). In some implementations, the semantic categorization module 1408 can, responsive to identifying the task, select the machine-learned model 1448 from the plurality of machine-learned models (e.g., based on a quantity of data elements included in the plurality of data elements, based on a type of data element selected, based on a current computational load at the computing system 1402, based on a predicted computational load at the computing system 1402, etc.). Alternatively, in some implementations, the machine-learned model 1448 can be a model (e.g., a large foundational model (LFM), a large language model (LLM), etc.) capable of performing most (or all) of the candidate tasks 1450.

The task identifier 1446 can include a prompt repository 1456. The prompt repository 1456 can include a plurality of prompts 1458-1-1458-N (generally, prompts 1458). The task identifier 1446 can retrieve a prompt 1458-1 from the prompt repository 1456 based on the task 1450-1 that was identified based on the request message 1434. The prompt 1458-1 can instruct the machine-learned model 1448 to perform the task 1450-1. More specifically, in some implementations, the prompt 1458-1 can instruct the machine-learned model 1448 to perform one or more actions 1460-1-1460-N (generally, action(s) 1460) to complete the task 1450-1. In some implementations, the action(s) 1460 can be expressed as instructions. For example, the action 1460-1 may be expressed in a prompt with the instruction "categorize these data elements based on a semantic commonality shared between the data elements." For another example, the action 1460-1 may be expressed in a prompt with the instruction "determine a categorization criterion for categorizing these data elements based on a semantic commonality shared between the data elements," the action 1460-2 may be expressed as "determine categories for the data elements based on the categorization criterion," and the action 1460-3 may be expressed as "assign the data elements to the determined categories."

For a specific example, as described previously, in some instances the machine-learned model 1448 can determine a categorization criterion 1462 by which to categorize the data elements 1412 selected by the user. The action 1458-1 described by the prompt 1458-1 may instruct the machine-learned model 1448 to determine the categorization criterion 1462. The action 1458-2 may instruct the machine-learned model 1448 to categorize the data elements 1412 based on the determined categorization criterion 1462. The action 1458-3 may instruct the machine-learned model 1448 to assign the data elements 1412 to the categories generated by the action 1458-2, etc. In some implementations, the prompts 1458 may only describe a single action. For example, the prompt 1458-1 for the task 1450-1 (e.g., the categorization task) may simply instruct the machine-learned model 1448 to semantically categorize any input data elements.

In some implementations, the machine-learned model 1448 can access network resources, such as web pages. For example, the machine-learned model can access information hosted on a web page when performing one of the tasks described in the task correspondence information 1454. The semantic categorization module 1408 can include sourcing information descriptive of the web page when sending the output to the data analytics application 1422.

In some implementations, the prompts 1458 may further describe preferences, constraints, objectives, etc. for completing a corresponding task. For example, the prompt 1458-1 may specify that the categorization criterion 1462 should be determined based on some semantic commonality shared between the data elements 1412. As described herein, a "semantic commonality" can refer to some similarity in meaning or a conceptual similarity between data elements. For example, assume that the data element 1412-1 is "North Carolina" and the data element 1412-2 is "South Carolina." The semantic commonalities shared between the two data elements can include both data elements being U.S. States, both states being on the east coast of the U.S., both states being in the Carolinas, both states being in the Southeast U.S., both states lacking major league baseball teams, both states having mountainous regions, both states having similar populations, both states having known interests in Barbeque cuisine, etc. The categorization criterion 1462 can be determined based on one or more of the semantic commonalities identified between the data elements. The machine-learned model 1448 can then categorize the data elements 1412 (i.e., generate categories and assign the data elements to the categories) in accordance with the categorization criterion 1462.

In some implementations, some (or all) of the prompts 1458 can include sub-prompts. For example, the prompt 1458 can include sub-prompts 1459-1 and 1459-2. The sub-prompts 1459-1 can correspond to specific sub-tasks to complete to perform a particular task. To follow the previous example, if the task 1450-1 is a categorization task, the sub-tasks 1452 may include a categorization criterion identification task, a category creation task, and a category assignment task. The sub-prompt 1459-1 may prompt the machine-learned model to perform the category creation sub-task while the sub-prompt 1459-2 prompts the machine-learned model to perform the category creation task and/or the category assignment task. In some implementations, the sub-tasks 1459 can correspond to the action(s) 1460 described by the prompt.

The semantic categorization module 1408 can process a set of inputs including the data elements 1412 selected by the user and the prompt 1458-1 with the machine-learned model 1448 to generate one or more model output(s) 1464. In some implementations, the set of inputs processed by the machine-learned model 1448 can include the initial user-defined category information 1436, the initial user-defined categorization criterion 1438, the metadata 1440 (or a portion thereof), etc. In some implementations, the set of inputs to the machine-learned model 1448 can include the categorization criterion 1462 (or information descriptive thereof). Alternatively, in some implementations, the machine-learned model 1448 can determine the categorization criterion 1462 when processing the set of inputs. In this manner, with a single interaction (e.g., a "click") with the interface element 1506-1 of FIG. 15, the user can cause the collection of contextual information, the selection of a semantic categorization task, and the performance of the semantic categorization task based on the contextual information with the machine-learned model 1448.

The model output(s) 1464 can include category information 1466 that describes a plurality of categories 1468-1-1468-N (generally, categories 1468) for the data elements 1412. The model output(s) 1464 can further include category assignment information 1470. The category assignment information 1470 can assign the data elements 1412 to the categories 1468 described by the category information 1466. It should be noted that the category information 1466 and the category assignment information 1470 are illustrated as two distinct elements only to more clearly illustrate various implementations of the present disclosure. Rather, in some implementations, the machine-learned model 1448 may generate a single model output that includes or otherwise indicates both the categories 1468 and the category assignments described by the category assignment information 1470.

The semantic categorization module 1408 can include a result handler 1472. The result handler 1472 can perform actions based on the model output(s) 1464 of the machine-learned model 1448. In some implementations, the result handler 1472 can modify the dataset 1410 (or some other dataset that includes some (or all) of the data elements 1412) with a categorical variable 1474 based on the categories 1468. For example, assume that the categorization criterion 1462 is a state population size criterion. The categorical variable 1474 may describe certain population sizes (e.g., 100,000 people, 50,000 people, and 10,000 people) by which to demarcate the categories 1468. The result handler 1472 may modify the dataset 1410 based on the categorical variable 1474. For example, if any of the data elements 1412 have population values substantially different than the categorical variable 1474 (e.g., a population of 1000), the result handler 1472 may highlight the outlier data element, remove the outlier data element, etc.

Additionally, or alternatively, in some implementations, the result handler 1472 can generate an output 1476 to be provided to the data analytics application 1422. The output 1476 can include the model output(s) 1464 (or a portion thereof). In some implementations, the output 1476 can include rendering instructions 1478. The rendering instructions 1478 can instruct the data analytics application 1422 how to render the model output(s) 1464 within the user interface 1424.

In some implementations, the output 1476 can further include output metadata 1480. The output metadata 1480 can include certain characteristics of the categorization process performed by the machine-learned model 1448 and/or operations performed by the task identifier 1446. Specifically, in some implementations, when processing the data elements 1412, the machine-learned model 1448 may access an external data source such as a web page. The output metadata 1480 can include the address for the web page, which information was obtained from the web page, etc. In some implementations, the rendering instructions 1478 can instruct the data analytics application 1422 to render portions of the output metadata 1480. For example, the rendering instructions 1478 may instruct the data analytics application 1422 to render the address of the web page from the output metadata 1480.

Figure 16:
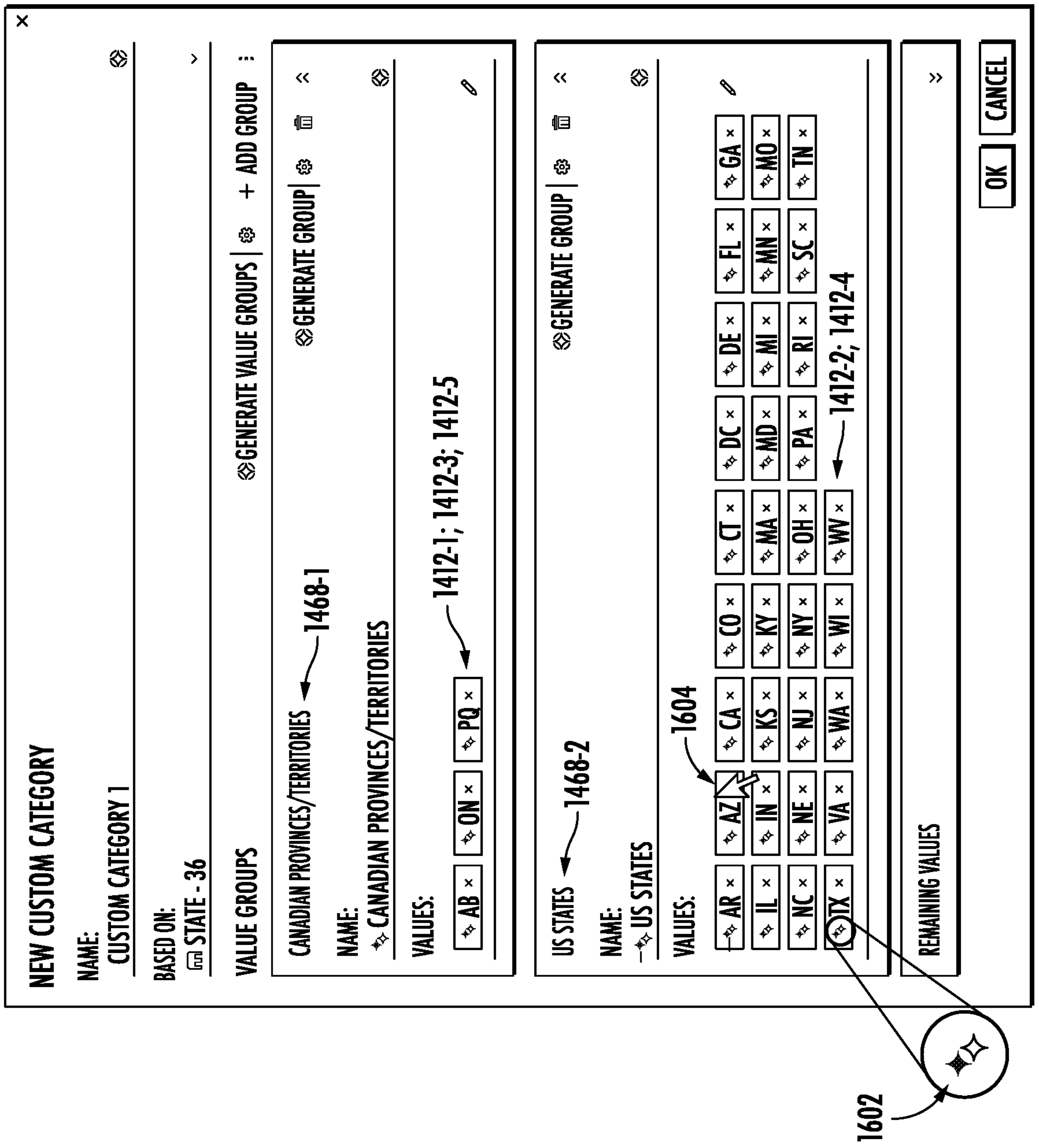
FIG. 16 illustrates a second view of the user interface of FIG. 14 according to some implementations of the present disclosure.

The computing system 1402 can send the output 1476 to the user computing device 1416. Upon receipt of the output 1476, the data analytics application 1422 executing on the user computing device 1416 can render the output(s) 1476 within the user interface 1424 of the data analytics application 1422. For a more specific example, turning to FIG. 16, FIG. 16 illustrates a second view 1600 of the user interface 1424 of FIG. 14 according to some implementations of the present disclosure. FIG. 16 will be discussed in conjunction with FIGS. 14 and 15. In particular, the second view 1600 represents a view of the interface following receipt and rendering of the model output(s) 1464.

For example, assume the user selects the generative context element 1510-2 from the first view 1500 of the user interface 1424. Following selection of the generative context element 1510-2, the user computing device 1416 can send the request message 1434 to the computing system 1402, and the computing system 1402 can provide the output 1476 to the user computing device 1416 in response. Following receipt of the output 1476, the data analytics application 1422 can render the second view 1600 of the user interface 1424, and the second view 1600 can include the model output(s) 1464. It should be noted that the second view 1600 is not necessarily intended to represent a view of the entirety of the user interface 1424 of the data analytics application 1422. Rather, the second view 1600 (and any other views of the user interface 1424) may omit certain portions of the user interface 1424 to more clearly illustrate various implementations of the present disclosure.

To follow the illustrated example, the categorization interface element 1508 is retained in the second view 1600 of the user interface 1424. However, the categorization interface element 1508 has now been populated based on the model output(s) 1464. For example, the categories 1468-1 and 1468-2 have been generated and added as value groups within the new custom category (e.g., Canadian Provinces/Territories" and "US States"). Further, at least some of the data elements 1412 have been assigned to the columns 1468-1 and 1468-2 within the user interface 1424. For example, the data elements 1412-1, 1412-3, and 1412-5 (e.g., "AB" and "ON" (i.e., Alberta and Ontario)) have been added to the "Canadian Provinces/Territories" category 1468-1, while the data elements 1412-2 and 1412-4 (e.g., "AR" and "AZ") have been added to the "US States" category 1468-2.

As depicted, the data elements 1412 have been assigned to the categories 1468 based on the category assignment information 1470. When assigned to a category based on the category assignment information 1470, the user interface 1424 can indicate that the assignment was based on the model output(s) 1464 by using an generative indicator element 1602. The generative indicator element 1602 can be placed adjacent to (or within) an element representing one of the data elements 1412 to indicate that a category assignment for the data element was performed based on the category assignment information 1470. In other words, the generative indicator element 1602 can indicate that the assignment of a data element to a particular category was determined by a machine-learned model such as the machine-learned model 1448 rather than being performed manually by a human operator.

In some implementations, the user interface 1424 can be configured to add the generative indicator element 1602 to each data element 1412 assigned to a category 1468 based on the category assignment information 1470. In some implementations, the user interface 1424 can be further configured to remove the generative indicator element 1602 from any data element representation that has been interacted with by a user of the data analytics application 1422.

Specifically, in some implementations, the data analytics application 1422 can include an automatic trigger mechanism configured to automatically stop rendering of the generative indicator element 1602 in response to detecting a user input that selects a category identified by the generative indicator element. For example, assume that the user places a third cursor element 1604 at the location of the interface element representing the data element 1412-4 (e.g., the "AZ" data element). If the user uses the cursor to "click and drag" this interface element from the "US States" column 1468-2 to the "Canadian Provinces/Territories" column 1468-1, the user interface 1424 can remove the generative indicator element 1602 from the interface element representing the data element 1412-4. In such fashion, implementations described herein can visually indicate whether the assignment of a particular data element to a category has been "confirmed" or otherwise reviewed by a human operator.

In some implementations, the user interface 1424 can remove the generative indicator element 1602 from an interface element representing a data element if the corresponding interface element is interacted with in other ways. To follow the previous example, assume that the user uses the third cursor element 1604 to begin to "click and drag" the interface element from the "US States" column 1468-2 to the "Canadian Provinces/Territories" column 1468-1, but then changes their mind and drags the interface element back to the "US States" column 1468-2. Here, the user interface 1424 can be configured to remove the generative indicator element 1602 from the corresponding interface element even though the data element 1412-4 was not reassigned. In some implementations, the interface element representing the data element 1412-4 may include a selectable "confirmation" element that can be selected to confirm human operator approval of the categorization. For example, user interface 1424 may be configured to remove the generative indicator element 1602 from the interface element representing the data element 1412-4 if the user "left-clicks" the interface element. For another example, the interface element representing the data element 1412-4 may include a selectable "confirmation" element (e.g., a checkmark, a "plus sign," etc.) that, when selected, causes removal of the generative indicator element 1602.

Figure 17A:
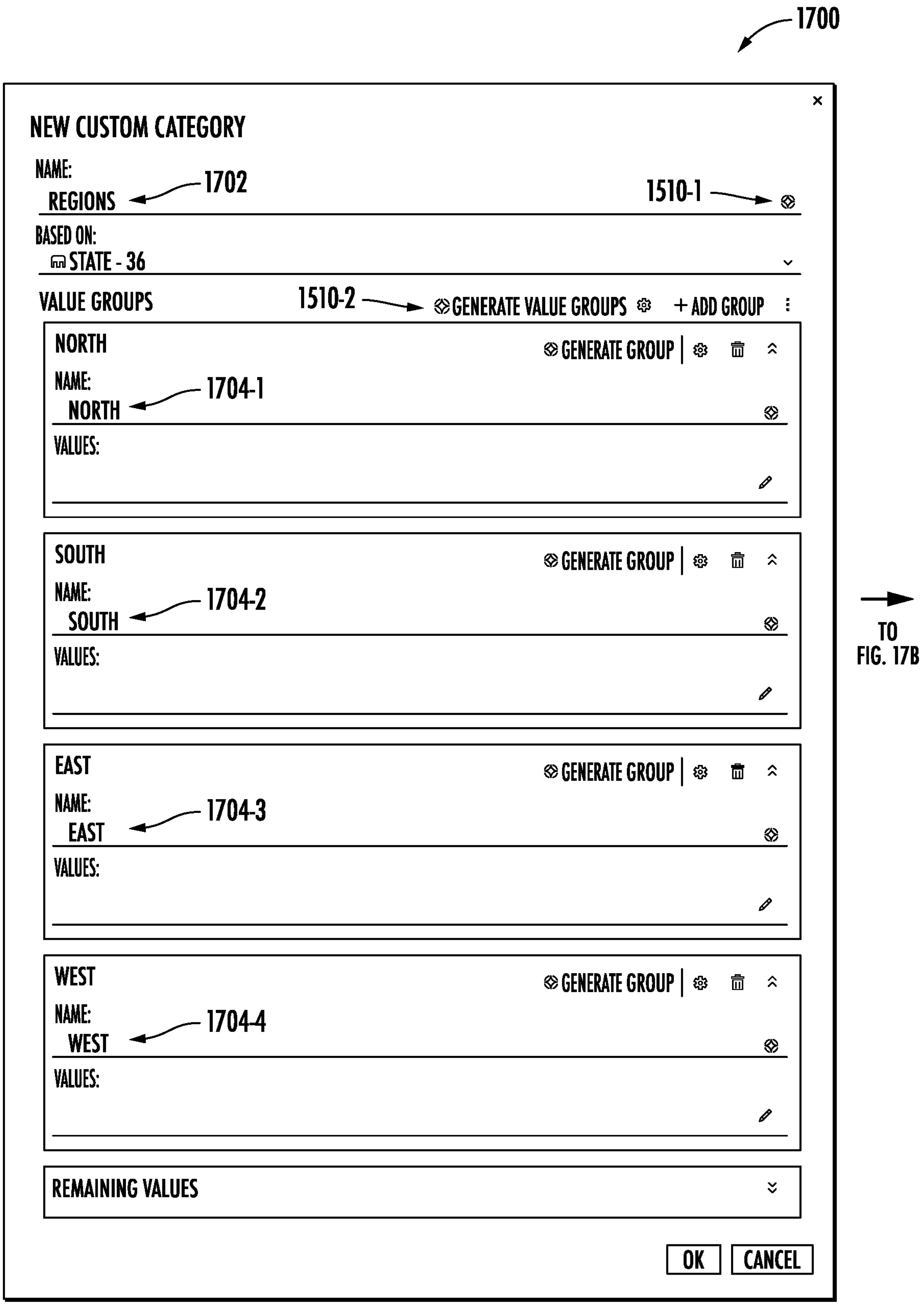
FIGS. 17A & 17B illustrates a third view of the user interface of FIG. 14 responsive to additional user context according to some implementations of the present disclosure.
Figure 17B:
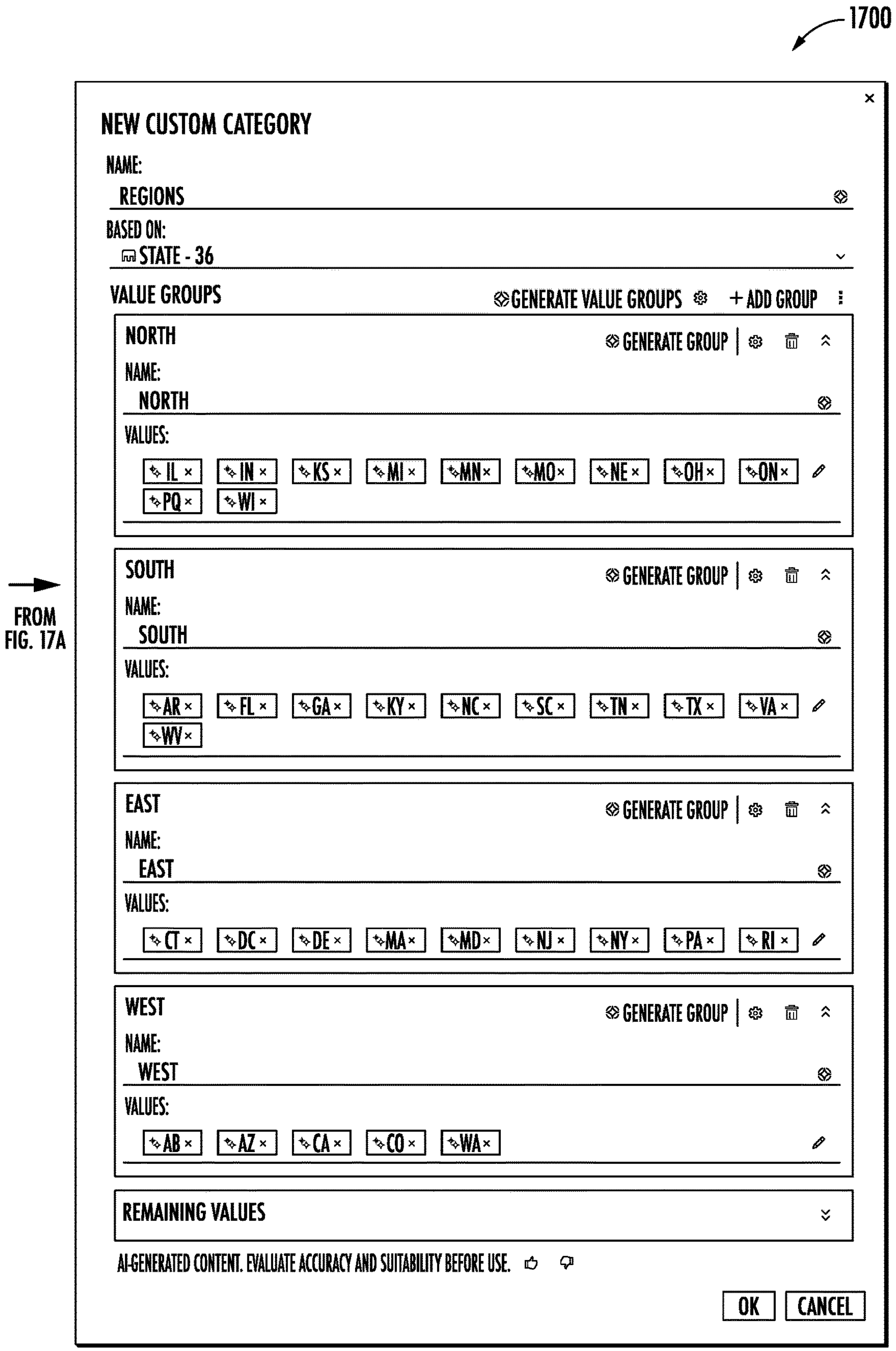

For another specific example, turning to FIGS. 17A-17B, FIGS. 17A-17B illustrates a third view 1600 of the user interface 1424 of FIG. 14 responsive to additional user context according to some implementations of the present disclosure. FIGS. 17A-17B will be discussed in conjunction with FIGS. 14-16. In particular, the third view 1700 represents a view of the interface following receipt and rendering of the model output(s) 1464 based on additional user context provided as a "title" or "label" for the custom categories being created by the machine-learned model.

The third view 1700 represents a view of the user interface 1424 that can be provided alternatively to the second view 1600 if the user of the data analytics application 1422 provides additional contextual information prior to sending the request message 1434 to the computing system 1402. Assume that the user enters a categorization label 1702 for the categories 1468 to be generated by the semantic categorization module 1408 (e.g., a "Regions" label). The categorization label 1702 may be manually entered by the user, or may be provided by the semantic categorization module in response to the user selecting the generative context element 1510-1 of FIG. 15 (e.g., thereby causing the semantic categorization module 1408 to generate the categorization label 1702 using the machine-learned model 1448).

In some implementations, when associated with a field for the categorization label 1702, the generative context element 1510-1 can be referred to as a label interface element. In some implementations, the label interface element can be associated with a labeling task from a plurality of candidate tasks described in the task correspondence information 1454.

Once the categorization label 1702 is added, the user can select the generative context element 1510-2. As described previously, selection of the generative context element 1510-2 by the user can cause the semantic categorization module 1408 to use the machine-learned model 1448 to generate custom categories for the data elements 1412 selected by the user and assign the data elements 1412 to the categories 1468. More specifically, upon selection of the generative context element 1510-2, the user computing device 1416 can send the request message 1434 to the semantic categorization module 1408. The initial user-defined category information 1436, or the metadata 1440, can include the categorization label 1702. The semantic categorization module 1408 can then provide the categorization label 1702 to the machine-learned model 1448 as context when generating the model output(s) 1464.

As illustrated in the third view 1700, the inclusion of the categorization label 1702 as context for the machine-learned model 1448 can affect the category information 1466 generated by the machine-learned model 1448. For example, the second view 1600 depicts categories 1468 that were generated without the categorization label 1702 or any other contextual indicators of semantic intent, and as such, represents a "default" categorization attempt that includes categories such as "Canadian Provinces/Territories" and "US States." Conversely, the third view 1700 depicts categories 1468 that were generated based on the categorization label 1702 (e.g., "Regions"). Based on the user specifying an overarching label of "regions" for the categories to be generated, the machine-learned model 1448 can infer that the user intends to categorize the data elements 1412 based on geographic regions, and as such, the categories 1468 can include categories such as East, West, North, etc. that correspond to geographic regions.

Alternatively, in some implementations, the user can further provide user-defined categories 1704-1-1704-4 (generally, user-defined categories 1704) in addition to the categorization label 1702. In some implementations, the user may provide one or more of the user-defined categories 1704, and the machine-learned model 1448 can generate any other necessary categories in addition to the user-defined categories 1704. For example, assume the user only provides the user-defined category 1704-1. The initial user-defined category information 1436 can be included in the request message 1434, and can include the user-defined category 1704-1. The semantic categorization module 1408 can then provide the user-defined category 1704-1 as context to the machine-learned model 1448. Based on the context of the user-defined category 1704-1, the category information 1466 can include categories 1468 such as "South," "East," "West," etc.

For another example, assume that the user provides each of the user-defined categories 1704. The user-defined categories 1704 can be included in the initial user-defined category information 1436 and can be provided as context to the machine-learned model 1448 as described previously. If the machine-learned model 1448 identifies categories to be included in addition to the user-defined categories 1704, the category information 1436 can describe the user-defined categories 1704 provided by the user and the categories 1468 generated by the model. If the machine-learned model 1448 does not identify any categories to be included in addition to the user-defined categories 1704, the category information 1436 can simply describe the user-defined categories 1704 provided by the user. It should be noted that, in some implementations, the machine-learned model 1448 can be configured to consider any user-defined categories 1704 as immutable. In other words, the machine-learned model 1448 can be configured (e.g., instructed, prompted, trained, etc.) to always include any provided user-defined categories 1704 within the categories 1468 and to forego any modifications to the user-defined categories 1704.

In some implementations, the categorization label 1702 can be determined at least in part on one or more of the user-defined categories 1704. For example, assume that the user enters the user-defined categories 1704 and then selects the generative context element 1510-1. In response, the request message 1434 can be sent to the semantic categorization module 1408 with the initial user-defined category information 1436. Based in part on the user defining categories such as "North," "South," etc., the machine-learned model 1448 can determine that "Regions" is an categorization label 1702 for the categories 1468.

Figure 18A:
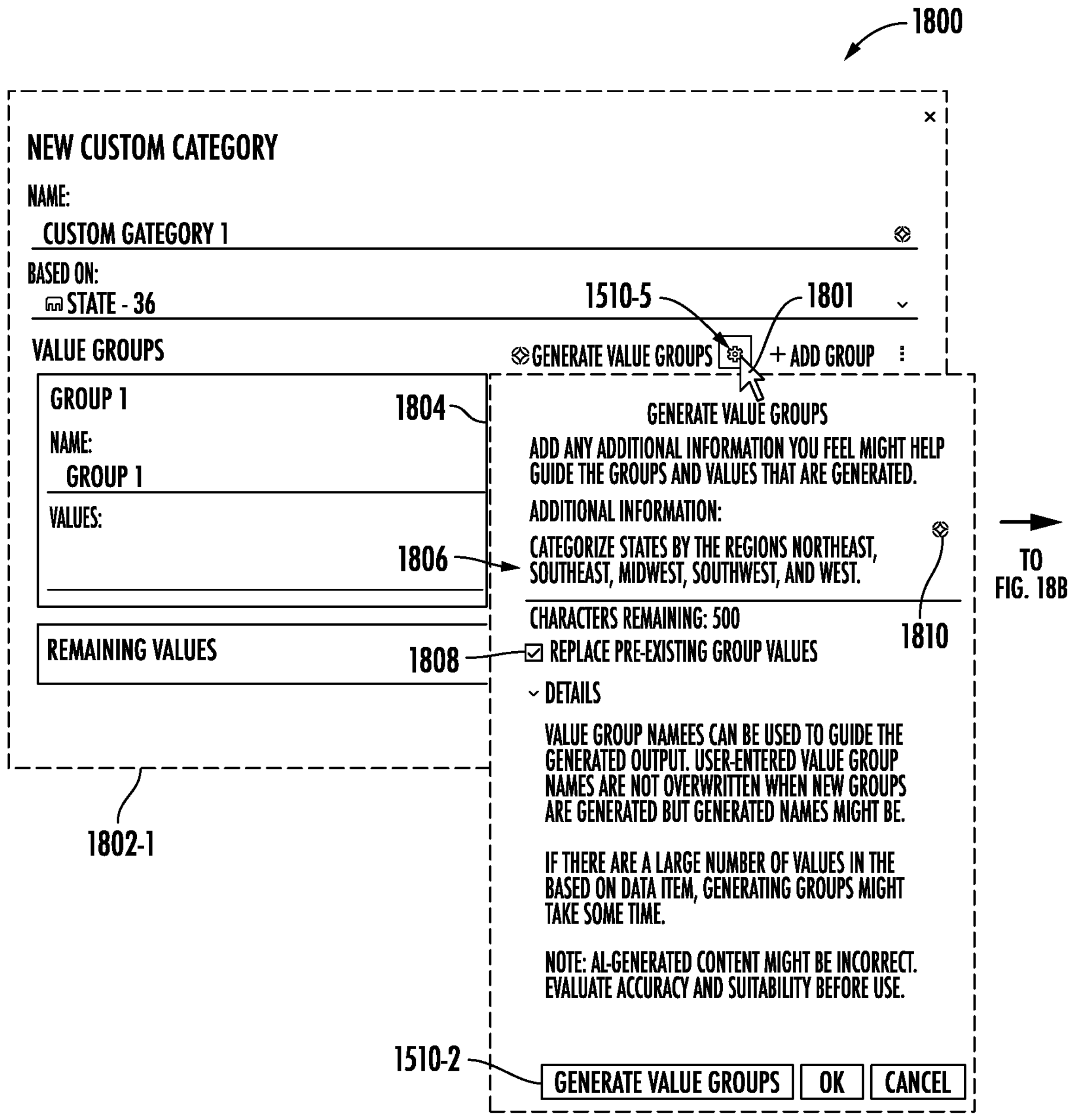
FIGS. 18A-18B illustrates a fourth view of the user interface of FIG. 14 responsive to additional user instructions according to some implementations of the present disclosure.
Figure 18B:
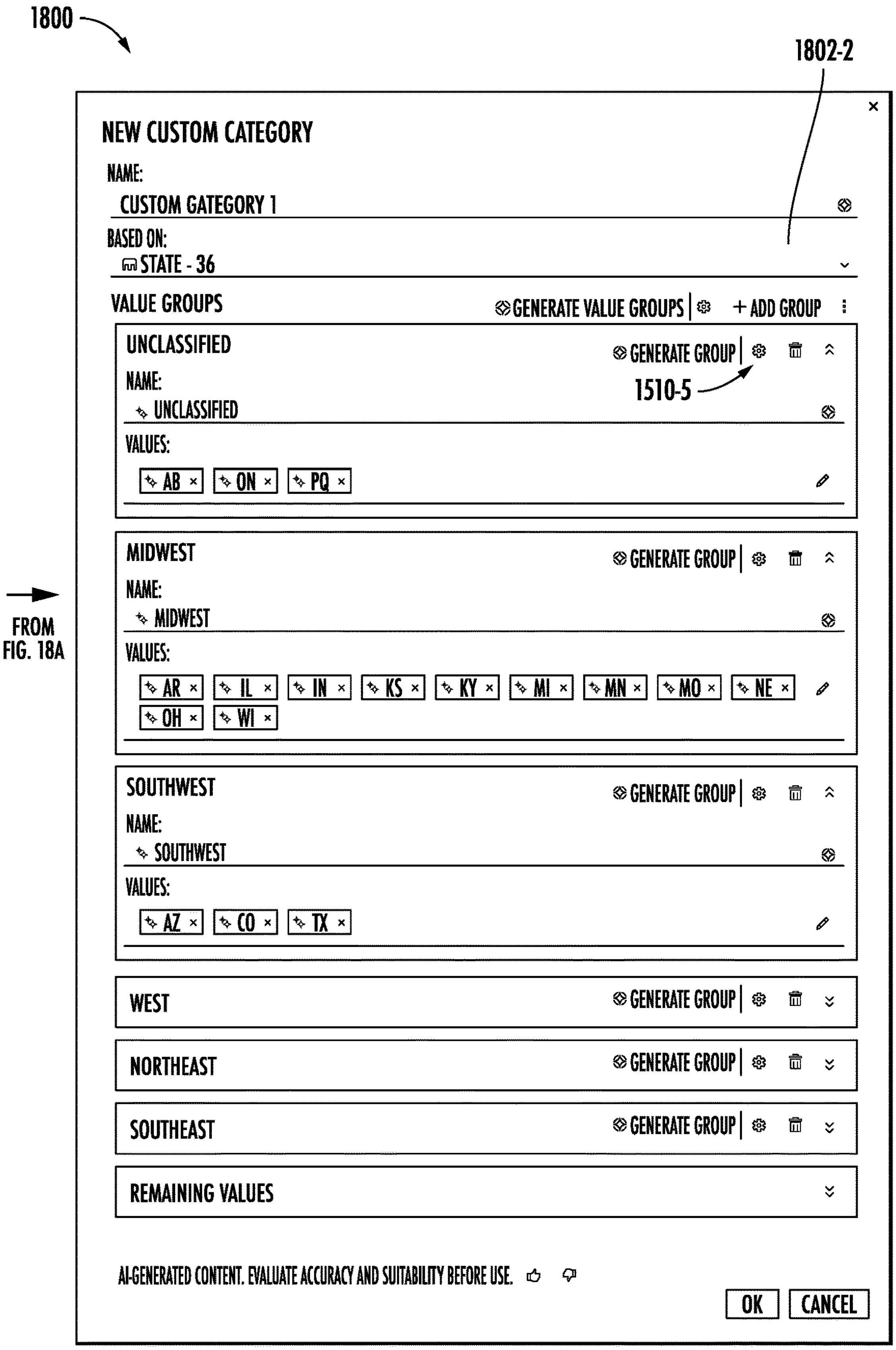

FIGS. 18A-18B illustrates a fourth view 1800 of the user interface 1424 of FIG. 14 responsive to additional user instructions according to some implementations of the present disclosure. FIGS. 18A-18B will be discussed in conjunction with FIGS. 14-17B. In particular, the fourth view 1800 includes a first sub-view 1802-1 of the user interface 1424 following selection of the generative context element 1510-5 (e.g., a "settings" icon) that, when selected, causes the user interface 1424 to render a group settings interface element 1804. The group settings interface element 1804 enables a user to provide additional contextual information that is not included in the contextual information provided alongside the selection of data elements, such as clarifying instructions, additional context from within (or external to) the dataset, etc. In this manner, implementations described herein enable the customizability and specificity provided by conversational interfaces while retaining the substantial benefits of the "one-click" functionality described previously.

The fourth view 1800 further includes a second sub-view 1802-2 of the user interface 1424 following provision of the output 1476 by the computing system 1402 in response to contextual information provided by the user via the group settings interface element 1804. The group settings interface element 1804 can include a text field 1806. The text field 1806 can enable a user to provide additional contextual information to be processed by the machine-learned model 1448 upon receipt of the request message 1434 at the semantic categorization module 1408. To follow the illustrated example, the user can select the generative context element 1510-5 with a fourth cursor element 1801 to cause rendering of the group settings interface element 1804 by the user interface 1424. The user can provide contextual information via the text field 1806 that instructs the machine-learned model 1448 to "categorize states by the regions Northeast, Southeast, Midwest, Southwest, and West." This contextual information can be included in the request message 1434 (e.g., as the initial user-defined categorization criterion 1438, as the metadata 1440, etc.). The machine-learned model 1448 can process the contextual information to generate the model output(s) 1464. The category information 1466 can describe the categories instructed by the user (e.g., Southwest, West, Northeast, etc.).

In some implementations, the generate group settings interface element 1804 can include a value replacement element 1808. The value replacement element 1808 can control whether categories previously generated by the machine-learned model 1448 can be replaced or modified by a subsequent call to the machine-learned model 1448. For example, assume that the user initially selects the generative context element 1510-2 to generate an initial set of the categories 1468 that includes a "United States" category. Further assume that the user selects the value replacement element 1808 and then selects the generative context element 1510-2 for a second time. The request message 1434 can be sent to the semantic categorization module 1408, and the metadata 1440 can indicate that the value replacement element 1808 was selected. In response to the value replacement element 1808 being selected, the semantic categorization module 1408 can instruct the machine-learned model 1448 that modifying categories previously created by the machine-learned model 1448 is permitted (e.g., by retrieving a corresponding prompt from the prompt repository 1456, etc.). The machine-learned model 1448 can then change the "United States" category to a category instructed by the user via the contextual information entered to the text field 1806 (e.g., Southeast, Midwest, Southwest, etc.).

In some implementations, the value replacement element 1808 can control whether previously generated categories can be modified based on whether a human operator has "confirmed" an existing category. In other words, a category that is represented by an interface element including the generative indicator element 1602, the category can be modified or replaced by the machine-learned model 1448 when the value replacement element 1808 is selected.

In some implementations, the generate group settings interface element 1804 can be rendered for a specific category, rather than the categories 1468 as a whole. To follow the illustrated example, the generative context element 1510-5 is illustrated in the second view 1802-2 as being rendered in association with a specific category (e.g., the "unclassified" category to which the data elements "AB", "ON", and "PQ" are assigned). If selected by the user, the user interface 1424 can render the group settings interface element 1804 in association with that particular category. Any information entered by the user to the text field 1806 within the rendered group settings interface element 1804 can be associated with the corresponding category by the request message 1434. For example, the interface element selection information 1432 can specify that the contextual information entered by the user to the text field 1806 was entered in relation with the "unclassified" category specifically.

Figure 19:
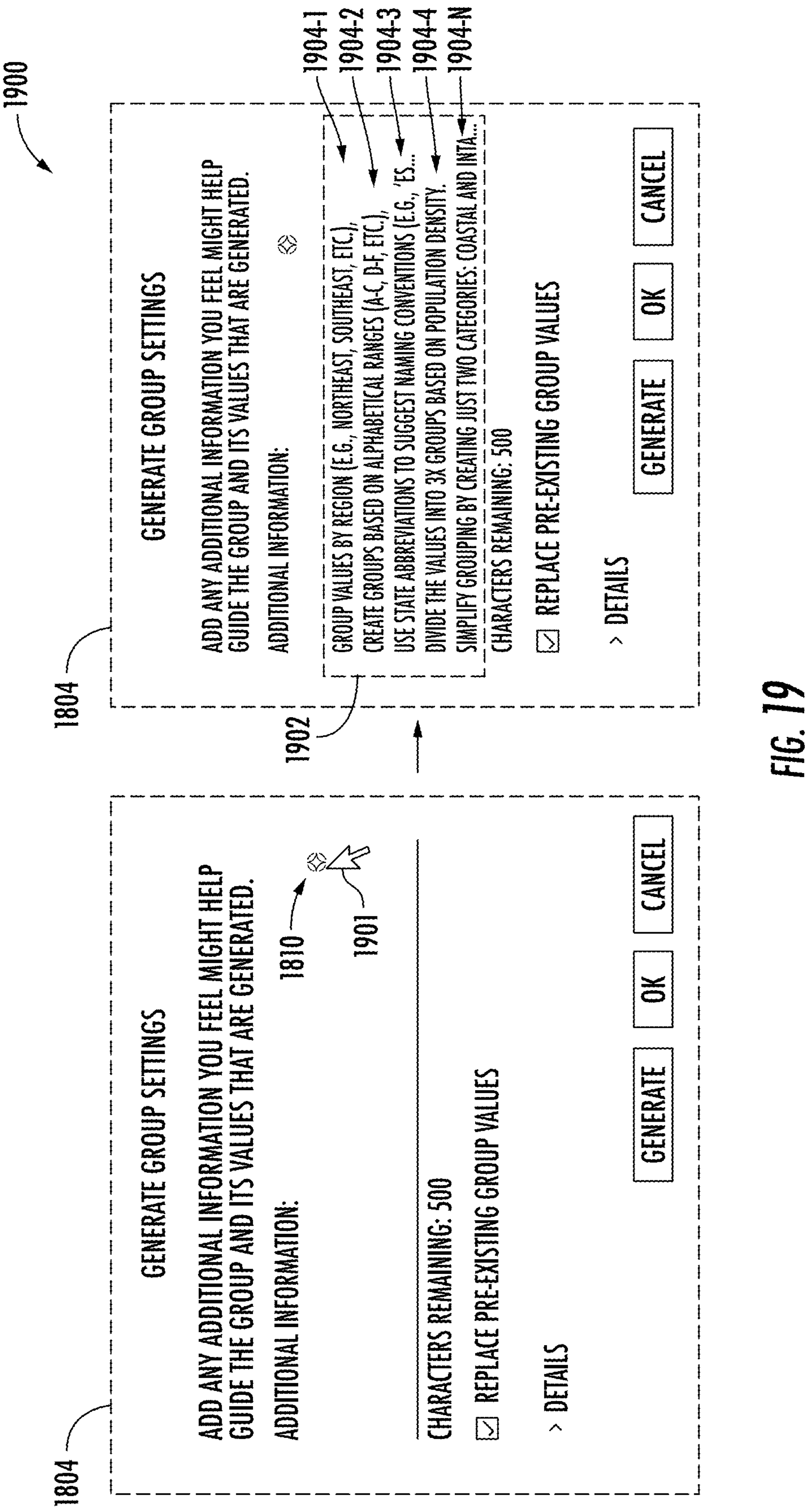
FIG. 19 illustrates a fifth view of the user interface of FIG. 14 responsive to additional user instructions according to some implementations of the present disclosure.

In some implementations, the group settings interface element 1804 can include a suggestion request element 1810. For a more specific example, turning to FIG. 19, FIG. 19 illustrates a fifth view 1900 of the user interface 1424 of FIG. 14 responsive to additional user instructions according to some implementations of the present disclosure. FIG. 19 will be discussed in conjunction with FIGS. 14-18. In particular, the fifth view 1900 depicts the selection of the suggestion request element 1810 of FIGS. 18A-18B by the user. In response to selection of the suggestion request element 1810, the user interface 1424 can render a criteria suggestion interface element 1902 within the group settings interface element 1804. Implementations described herein enable provision of model-generated suggestions for categorization criterions while retaining the substantial benefits of the "one-click" functionality described previously. In this manner, users can select between a wide variety of categorization criteria generated based on the vast knowledge base of a machine-learned model while obviating the need to communicate via an onerous and inefficient chat interface.

The criteria suggestion interface element 1902 can include a plurality of candidate categorization criteria 1904-1-1904-N (generally, candidate categorization criteria 1904) generated by the semantic categorization module 1408 (e.g., using the machine-learned model 1448) and returned to the data analytics application 1422 for rendering. Each of the candidate categorization criteria 1904 can describe a different candidate categorization criteria by which the data elements 1412 can be categorized. The candidate categorization criteria 1904 can be displayed within the criteria suggestion interface element 1902.

To follow the illustrated example, the user can select the suggestion request element 1810 with a fifth cursor element 1901. The data analytics application 1422 can send the request message 1434 to the semantic categorization module 1408. The request message 1434 can specify a request for the candidate categorization criteria 1904. In response, the semantic categorization module 1408 can select a prompt from the prompt repository 1456 that prompts the machine-learned model to generate multiple of the categorization criterion 1462. The candidate categorization criteria 1904 identified by the machine-learned model 1448 can then be provided to the data analytics application 1422 via the output 1476 for rendering within the criteria suggestion interface element 1902. The user can then select one of the candidate categorization criteria 1904. Selecting one of the candidate categorization criteria 1904 can signal to the semantic categorization module 1408 to use the selected candidate categorization criteria 1904 to categorize the data elements 1412.

It should be noted that nested interface elements, such as the text field 1806, the suggestion request element 1810, the criteria suggestion interface element 1902, the candidate categorization criteria 1904, etc., may also be referred to as "sub-elements" as described herein. Further, user inputs to sub-elements, such as textual content input to the text field 1806, or selection of one of the candidate categorization criteria 1904, may be referred to as "sub-inputs" as described herein.

For a specific example, assume that the user selects the interface element corresponding to the candidate categorization criterion 1904-1. The data analytics application 1422 can send the request message 1434 to the semantic categorization module 1408. The interface element selection information 1432 can indicate a first sub-input of the user that selects the element corresponding to the categorization criterion 1904-1 within the criteria suggestion interface element 1902. Based on the selection, the task identifier 1446 can identify a categorization criterion suggestion task and retrieve a corresponding prompt from the prompt repository 1456. The semantic categorization module 1408 can process the retrieved prompt and the data elements 1412 with the machine-learned model 1448 to generate the candidate categorization criteria 1904. The semantic categorization module 1408 can send, to the data analytics application 1422, the candidate categorization criteria 1904 for display within the criteria suggestion interface element 1902 rendered in the data analytics application 1422. The data analytics application 1422 can then detect or receive a second sub-input of the user that selects a first categorization criterion 1904-1 from the plurality of candidate categorization criteria 1904.

Figure 20:
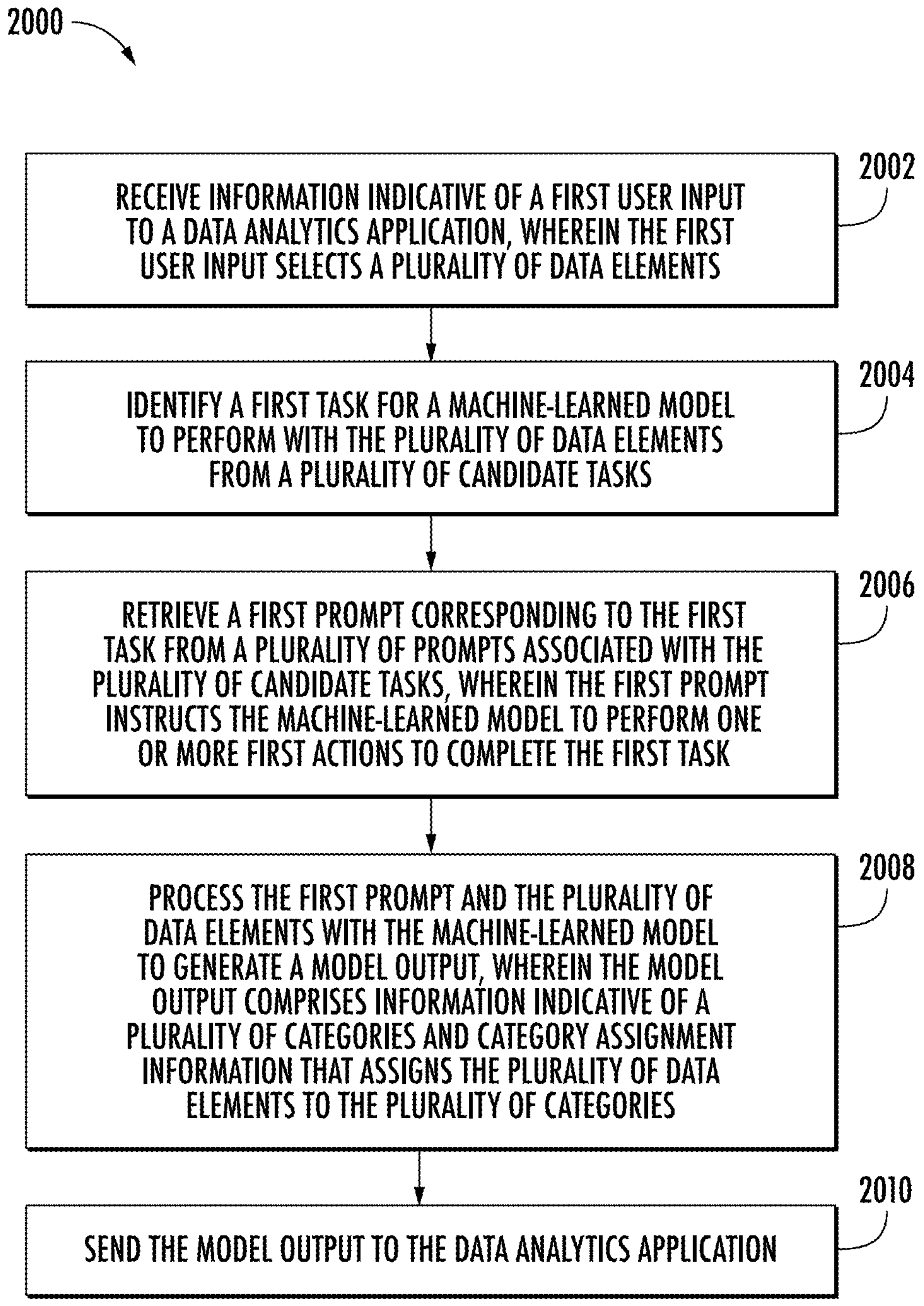
FIG. 20 depicts a flow chart diagram of an example method for semantic data grouping with machine-learned models according to some implementations of the present disclosure.

FIG. 20 depicts a flow chart diagram of an example method 2000 for semantic data grouping with machine-learned models according to some implementations of the present disclosure. Although FIG. 20 depicts steps performed in a particular order for purposes of illustration and discussion, the methods of the present disclosure are not limited to the particularly illustrated order or arrangement. The various steps of the method 2000 can be omitted, rearranged, combined, and/or adapted in various ways without deviating from the scope of the present disclosure.

At 2002, a computing system can receive information indicative of a first user input to a data analytics application, wherein the first user input selects a plurality of data elements. In some implementations, the information indicative of the first user input further comprises contextual information. In some implementations, the contextual information comprises metadata descriptive of one or more prior data elements previously selected by a user associated with the first user input, a column of data elements previously selected by the user, a geographic location of the user, and/or candidate categorization criteria previously selected by the user. In some implementations, the information indicative of the first user input is received from a user computing device, and the user computing device executes the data analytics application.

In some implementations, prior to receiving the information indicative of the first user input to the data analytics application, the computing system can provide, to the user computing device, a unit of software instructions comprising the data analytics application, wherein the unit of software instructions is configured for execution in an internet browser.

In some implementations, the contextual information is descriptive of a category created by a user associated with the first user input prior to receipt of the information indicative of the first user input. To identify the first task to perform with the plurality of data elements from the plurality of candidate tasks, the computing system can identify the first task based at least in part on the category created by the user. The first task includes a categorization task for the machine-learned model to perform by categorizing the selected plurality of data elements in accordance with a first categorization criterion. In some implementations, the plurality of categories comprises the category created by the user, and the first prompt comprises instructions that forbid the machine-learned model from modifying the category created by the user.

At 2004, the computing system can identify a first task for a machine-learned model to perform with the plurality of data elements from a plurality of candidate tasks. In some implementations, the first user input selects the plurality of data elements and a first interface element of a plurality of interface elements rendered within the data analytics application. The first interface element corresponds to the first task, and the first task includes a categorization task for the machine-learned model to perform by categorizing the selected plurality of data elements in accordance with a first categorization criterion. In some implementations, to process the first prompt and the plurality of data elements with the machine-learned model to generate the model output, the computing system can determine the first categorization criterion based on a semantic commonality shared between the plurality of data elements. In some implementations, determining the first categorization criterion based on the semantic commonality shared between the plurality of data elements is a particular action of the one or more first actions the first prompt instructs the machine-learned model to perform.

In some implementations, to identify the first task, the computing system can determine the first categorization criterion based on the category created by the user. Specifically, in some implementations, the computing system can determine a predicted categorization criterion corresponding to the category created by the user (e.g., with the machine-learned model, etc.). For example, if the category created by the user is "Northeast", the computing system can determine a predicted categorization criterion of "geographic regions." The computing system can select the predicted categorization criterion for the first categorization criterion. In some implementations, the computing system can do so based on a confidence value associated with the predicted categorization criterion being higher than a threshold value. For example, the first prompt instructs the machine-learned model to perform one or more first actions to complete the first task. The one or more first actions can include optional action(s) to perform if the user has already created a category prior to receiving the first user input. The optional action(s) can include predicting a categorization criterion by which the user created the category, and a corresponding confidence value. The optional action(s) can further include comparing the confidence value to a threshold value, and using the predicted categorization criterion if the confidence value is higher than a threshold.

At 2006, the computing system can retrieve a first prompt corresponding to the first task from a plurality of prompts associated with the plurality of candidate tasks, wherein the first prompt instructs the machine-learned model to perform one or more first actions to complete the first task.

At 2008, the computing system can process the first prompt and the plurality of data elements with the machine-learned model to generate a model output, wherein the model output comprises information indicative of a plurality of categories and category assignment information that assigns the plurality of data elements to the plurality of categories. In some implementations, each of the plurality of data elements belong to a primary category, and the one or more categories respectively include one or more secondary categories of the primary category. In some implementations, each of the plurality of data elements are retrieved from a first row of a plurality of rows of a data set or a first column of a plurality of columns of the data set.

In some implementations, the information indicative of the second user input selects the categorization criterion from a plurality of candidate categorization criteria displayed within the second interface element. To receive the information indicative of the second user input to the data analytics application, the computing system can receive information indicative of a first sub-input of the second user input that selects a first sub-element of the second interface element. The first sub-element corresponds to a second task of the plurality of candidate tasks, and the second task includes a categorization criterion suggestion task. The computing system can process the plurality of data elements with the machine-learned model to generate the plurality of candidate categorization criteria. The computing system can send, to the data analytics application, the plurality of candidate categorization criteria for display within the data analytics application. The computing system can receive a second sub-input of the second user input that selects a first categorization criterion from the plurality of candidate categorization criteria.

In some implementations, to process the plurality of data elements with the machine-learned model to generate the plurality of candidate categorization criteria, the computing system can retrieve a second prompt corresponding to the second task from a plurality of prompts associated with the plurality of candidate tasks. The second prompt instructs the machine-learned model to generate the plurality of candidate categorization criteria.

In some implementations, to process the first prompt and the plurality of data elements with the machine-learned model, the computing system can process the first prompt, the plurality of data elements, and the textual content with the machine-learned model to generate the model output, The model output can include information indicative of the plurality of categories. The plurality of categories are based on the particular categorization criterion.

In some implementations, the machine-learned model includes a first machine-learned model of a plurality of machine-learned models accessible to the computing system. To retrieve the first prompt corresponding to the first task from the plurality of prompts associated with the plurality of candidate tasks, the computing system can, responsive to identifying the first task, select the first machine-learned model from the plurality of machine-learned models based on a quantity of data elements included in the plurality of data elements.

In some implementations, to process the first prompt and the plurality of data elements with the machine-learned model, the computing system can access, by the machine-learned model, information hosted on a web page. To send the model output to the data analytics application, the computing system can send sourcing information descriptive of the web page to the data analytics application.

At 2010, the computing system can send the model output to the data analytics application. In some implementations, to send the model output to the data analytics application, the computing system can send, to the data analytics application, instructions that cause the data analytics application to render a generative indicator element for each of the plurality of categories other than the category created by the user. The generative indicator element identifies a category as being a generative output of the machine-learned model. In some implementations, the generative indicator element is configured to be removed from display in response to user interaction with a category identified by the generative indicator element.

In some implementations, the computing system can receive information indicative of a second user input to the data analytics application that selects a second interface element of the plurality of interface elements, The information indicative of the second user input is indicative of a particular categorization criterion. In some implementations, the second interface element includes a text entry field, and the information indicative of the second user input includes textual content provided by the user via the text entry field. The textual content is descriptive of the particular categorization criterion. In some implementations, the particular categorization criterion includes a second categorization criterion different than the first categorization criterion. The plurality of categories are generated based on the first categorization criterion.

In some implementations, the computing system can, subsequent to sending the model output to the data analytics application, process the plurality of data elements and the textual content with the machine-learned model to generate a second model output. The second model output includes information indicative of a second plurality of categories based on the second categorization criterion. In some implementations, the computing system can send the second model output comprising the information indicative of the second plurality of categories to the data analytics application to replace the plurality of categories.

In some implementations, the computing system can receive information indicative of a user input that selects a label interface element rendered within the data analytics application. The label interface element corresponds to a third task of the plurality of candidate tasks. The third task can include a labeling task for the machine-learned model to perform by generating a label descriptive of the plurality of categories. The computing system can process one or more inputs with the machine-learned model to generate the label. The one or more inputs can include the information indicative of the plurality of categories and/or a categorization criterion. The plurality of categories can be generated in accordance with the categorization criterion. The computing system can send the label to the data analytics application.

In some implementations, the computing system can modify a data set with a categorical variable based on the plurality of categories.

Individuals will recognize improvements and modifications to the preferred examples of the disclosure. All such improvements and modifications are considered within the scope of the concepts disclosed herein and the claims that follow.

What is claimed is:

1. A computer-program product tangibly embodied in a non-transitory machine-readable storage medium, the computer-program product including instructions operable to cause one or more processor devices to:

receive information indicative of a first user input to a data analytics application, wherein the first user input selects a plurality of data elements;

identify a first task for a machine-learned model to perform with the plurality of data elements from a plurality of candidate tasks;

retrieve a first prompt corresponding to the first task from a plurality of prompts associated with the plurality of candidate tasks, wherein the first prompt instructs the machine-learned model to perform one or more first actions to complete the first task;

process the first prompt and the plurality of data elements with the machine-learned model to generate a model output, wherein the model output comprises:

information indicative of a plurality of categories, at least one of the plurality of categories being generated by the machine-learned model based on a first categorization criterion, wherein the first categorization criterion is identified by the machine-learned model; and category assignment information that assigns the plurality of data elements to the plurality of categories; and send the model output to the data analytics application.

2. The computer-program product of claim 1, wherein the plurality of data elements comprises a first data grouping of a plurality of data groupings of a dataset, wherein the information indicative of the first user input comprises contextual information descriptive of the plurality of data groupings of the dataset, and wherein, to process the first prompt and the plurality of data elements with the machine-learned model, the one or more processor devices are to:

process the first prompt, the plurality of data elements, and the contextual information with the machine-learned model to generate the model output, wherein the first prompt instructs the machine-learned model to perform the first task based on the contextual information.

3. The computer-program product of claim 2, wherein the data analytics application comprises a user interface comprising a menu interface element rendered in association with the plurality of data elements, wherein the menu interface element comprises a task selection element corresponding to the first task, and wherein the first user input selects the plurality of data elements by selecting an interface element from within the menu interface element rendered in association with the plurality of data elements.

4. The computer-program product of claim 1, wherein the first user input selects the plurality of data elements and a first interface element of a plurality of interface elements rendered within the data analytics application, wherein the first interface element corresponds to the first task, and wherein the first task comprises a semantic data categorization task for the machine-learned model to perform by categorizing the plurality of data elements in accordance with the first categorization criterion.

5. The computer-program product of claim 4, wherein the plurality of data elements comprises a first data grouping of a plurality of data groupings of a dataset, wherein the information indicative of the first user input comprises contextual information descriptive of the plurality of data groupings of the dataset, and wherein, to process the first prompt and the plurality of data elements with the machine-learned model to generate the model output, the one or more processor devices are to:

determine the first categorization criterion based at least in part on the contextual information.

6. The computer-program product of claim 4, wherein, to process the first prompt and the plurality of data elements with the machine-learned model to generate the model output, the one or more processor devices are to:

determine the first categorization criterion based on a semantic commonality shared between the plurality of data elements.

7. The computer-program product of claim 6, wherein determining the first categorization criterion based on the semantic commonality shared between the plurality of data elements comprises a particular action of the one or more first actions the first prompt instructs the machine-learned model to perform.

8. The computer-program product of claim 1, wherein the information indicative of the first user input further comprises contextual information that is collected by the data analytics application automatically in response to receiving the first user input.

9. The computer-program product of claim 8, wherein the contextual information comprises metadata descriptive of:

one or more prior data elements previously selected by a user associated with the first user input;

a column of data elements previously selected by the user; or a geographic location of the user; or candidate categorization criteria previously selected by the user.

10. The computer-program product of claim 8, wherein the contextual information is descriptive of a category created by a user associated with the first user input prior to receipt of the information indicative of the first user input; and wherein, to identify the first task to perform with the plurality of data elements from the plurality of candidate tasks, the one or more processor devices are to:

identify the first task based at least in part on the category created by the user, wherein the first task comprises a semantic data categorization task for the machine-learned model to perform by categorizing the plurality of data elements in accordance with the first categorization criterion.

11. The computer-program product of claim 10, wherein the plurality of categories comprises the category created by the user, and wherein the first prompt comprises instructions that forbid the machine-learned model from modifying the category created by the user.

12. The computer-program product of claim 11, wherein, to send the model output to the data analytics application, the one or more processor devices are further to:

send, to the data analytics application, instructions that cause the data analytics application to render a generative indicator element for each of the plurality of categories other than the category created by the user, wherein the generative indicator element identifies a category as being a generative output of the machine-learned model.

13. The computer-program product of claim 12, wherein the data analytics application comprises an automatic trigger mechanism configured to automatically stop rendering of a generative indicator element in response to detecting a user input that selects a category identified by the generative indicator element.

14. The computer-program product of claim 1, wherein the information indicative of the first user input is received from a user computing device, and wherein the user computing device executes the data analytics application.

15. The computer-program product of claim 14, wherein, prior to receiving the information indicative of the first user input to the data analytics application, the one or more processor devices are to:

provide, to the user computing device, a unit of software instructions comprising the data analytics application, wherein the unit of software instructions is configured for execution in an internet browser.

16. The computer-program product of claim 1, wherein the machine-learned model comprises a first machine-learned model of a plurality of machine-learned models accessible to the one or more processor devices, and wherein, to retrieve the first prompt corresponding to the first task from the plurality of prompts associated with the plurality of candidate tasks, the one or more processor devices are to:

responsive to identifying the first task, select the first machine-learned model from the plurality of machine-learned models based on a quantity of data elements included in the plurality of data elements.

17. The computer-program product of claim 1, wherein the one or more processor devices are further to:

receive information indicative of a user input that selects a label interface element rendered within the data analytics application, wherein the label interface element corresponds to a third task of the plurality of candidate tasks, and wherein the third task comprises a labeling task for the machine-learned model to perform by generating a label descriptive of the plurality of categories;

process one or more inputs with the machine-learned model to generate the label, wherein the one or more inputs comprise at least one of:

the information indicative of the plurality of categories; or the first categorization criterion, wherein the plurality of categories are generated in accordance with the first categorization criterion; and send the label to the data analytics application.

18. The computer-program product of claim 1, wherein, to process the first prompt and the plurality of data elements with the machine-learned model, the one or more processor devices are to:

access, by the machine-learned model, information hosted on a web page; and wherein, to send the model output to the data analytics application, the one or more processor devices are further to:

send sourcing information descriptive of the web page to the data analytics application.

19. A computing system, comprising:

a processor device; and a non-transitory computer-readable storage medium containing instructions which, when executed on the processor device, causes the processor device to:

receive information indicative of a first user input to a data analytics application, wherein the first user input selects a plurality of data elements;

identify a first task for a machine-learned model to perform with the plurality of data elements from a plurality of candidate tasks;

retrieve a first prompt corresponding to the first task from a plurality of prompts associated with the plurality of candidate tasks, wherein the first prompt instructs the machine-learned model to perform one or more first actions to complete the first task;

process the first prompt and the plurality of data elements with the machine-learned model to generate a model output, wherein the model output comprises:

information indicative of a plurality of categories, at least one of the plurality of categories being generated by the machine-learned model based on a first categorization criterion, wherein the first categorization criterion is identified by the machine-learned model; and category assignment information that assigns the plurality of data elements to the plurality of categories; and send the model output to the data analytics application.

20. The computing system of claim 19, wherein each of the plurality of data elements belong to a primary category, and wherein one or more categories of the plurality of categories respectively comprise one or more secondary categories of the primary category.

21. The computing system of claim 20, wherein each of the plurality of data elements is retrieved from a first row of a plurality of rows of a data set or a first column of a plurality of columns of the data set.

22. A method, comprising:

receiving, by a computing system comprising one or more processor devices, information indicative of a first user input to a data analytics application, wherein the first user input selects a plurality of data elements;

identifying, by the computing system, a first task for a machine-learned model to perform with the plurality of data elements from a plurality of candidate tasks;

retrieving, by the computing system, a first prompt corresponding to the first task from a plurality of prompts associated with the plurality of candidate tasks, wherein the first prompt instructs the machine-learned model to perform one or more first actions to complete the first task;

processing, by the computing system, the first prompt and the plurality of data elements with the machine-learned model to generate a model output, wherein the model output comprises:

information indicative of a plurality of categories, at least one of the plurality of categories being generated by the machine-learned model based on a first categorization criterion, wherein the first categorization criterion is identified by the machine-learned model; and category assignment information that assigns the plurality of data elements to the plurality of categories; and sending, by the computing system, the model output to the data analytics application.

* * * * *